(12) United States Patent
Thakker et al.

(10) Patent No.: US 11,663,814 B2
(45) Date of Patent: May 30, 2023

(54) SKIP PREDICTOR FOR PRE-TRAINED RECURRENT NEURAL NETWORKS

(71) Applicant: Arm Limited, Cambridge (GB)

(72) Inventors: Urmish Ajit Thakker, Austin, TX (US); Jin Tao, Pullman, WA (US); Ganesh Suryanarayan Dasika, Austin, TX (US); Jesse Garrett Beu, Austin, TX (US)

(73) Assignee: Arm Limited, Cambridge (GB)

( * ) Notice: Subject to any disclaimer, the term of this patent is extended or adjusted under 35 U.S.C. 154(b) by 493 days.

(21) Appl. No.: 16/855,681

(22) Filed: Apr. 22, 2020

(65) Prior Publication Data
US 2021/0056422 A1 Feb. 25, 2021

Related U.S. Application Data

(60) Provisional application No. 62/890,996, filed on Aug. 23, 2019.

(51) Int. Cl.
*G06N 3/08* (2023.01)
*G06N 3/082* (2023.01)
(Continued)

(52) U.S. Cl.
CPC ............ *G06N 3/082* (2013.01); *G06F 17/18* (2013.01); *G06K 9/6267* (2013.01); *G06N 3/0472* (2013.01)

(58) Field of Classification Search
CPC .... G06N 3/0445; G06N 3/082; G06N 3/0454; G06N 20/20; G06N 3/0472; G06N 3/006;
(Continued)

(56) References Cited

U.S. PATENT DOCUMENTS 9,607,616 B2 * 3/2017 Watanabe ............... G10L 15/22
11,260,872 B2 * 3/2022 Chen ..................... G06V 40/20
(Continued)

FOREIGN PATENT DOCUMENTS

WO WO-2017201511 A1 * 11/2017 ........... G06N 3/0445

OTHER PUBLICATIONS

Diao et al.; "Restricted Recurrent Neural Networks"; 2019 IEEE International Conference on Big Data (Big Data); Conference Paper | Publisher: IEEE; (3) (Year: 2019).*
(Continued)

*Primary Examiner* — Helen Rossoshek
(74) *Attorney, Agent, or Firm* — Leveque Intellectual Property Law, P.C.

(57) ABSTRACT

The present disclosure advantageously provides a system and a method for skipping recurrent neural network (RNN) state updates using a skip predictor. Sequential input data are received and divided into sequences of input data values, each input data value being associated with a different time step for a pre-trained RNN model. At each time step, the hidden state vector for a prior time step is received from the pre-trained RNN model, and a determination, based on the input data value and the hidden state vector for at least one prior time step, is made whether to provide or not provide the input data value associated with the time step to the pre-trained RNN model for processing. When the input data value is not provided, the pre-trained RNN model does not update its hidden state vector. Importantly, the skip predictor is trained without retraining the pre-trained RNN model.

20 Claims, 14 Drawing Sheets

(51) Int. Cl.
*G06F 17/18* (2006.01)
*G06K 9/62* (2022.01)
*G06N 3/04* (2023.01)

(58) Field of Classification Search
CPC .......... G06N 3/08; G06N 5/003; G06N 7/005; G06F 17/18; G06K 9/6267; G06K 9/627; G06V 10/764; G06V 10/82
See application file for complete search history.

(56) References Cited

U.S. PATENT DOCUMENTS

| | | | |
|---|---|---|---|
| 2018/0204111 A1* | 7/2018 | Zadeh | G06N 3/0436 |
| 2018/0307899 A1* | 10/2018 | Das | G06V 40/23 |
| 2018/0329883 A1* | 11/2018 | Leidner | G06F 40/247 |
| 2019/0287012 A1* | 9/2019 | Celikyilmaz | G06N 3/0445 |
| 2019/0294962 A1* | 9/2019 | Vezer | G06N 3/088 |
| 2020/0074318 A1* | 3/2020 | Chen | G06N 3/0445 |
| 2020/0142421 A1* | 5/2020 | Palanisamy | G06N 3/0454 |
| 2020/0184278 A1* | 6/2020 | Zadeh | G06K 9/6264 |
| 2020/0251098 A1* | 8/2020 | Metallinou | G10L 15/197 |
| 2020/0279135 A1* | 9/2020 | Yehezkel Rohekar | G06F 9/46 |
| 2020/0320776 A1* | 10/2020 | Doyle | G06T 15/06 |
| 2021/0012769 A1* | 1/2021 | Vasconcelos | G10L 15/22 |
| 2021/0027018 A1* | 1/2021 | Lin | G06N 3/08 |
| 2021/0130868 A1* | 5/2021 | Tao | G06T 7/0012 |
| 2021/0248008 A1* | 8/2021 | Thakker | G06N 3/082 |
| 2021/0279841 A1* | 9/2021 | Liu | G06N 3/0454 |

OTHER PUBLICATIONS

Hahn et al., "Modeling Task Effects in Human Reading with Neural Attention," arxiv.org, Cornell University Library, 201 Olin Library Cornell University Ithaca, NY 14853, Jul. 31, 2018, XP081040520.
Campos et al., Skip RNN: Learning to Skip State Updates in Recurrent Neural Networks, arXiv:1708.06834v3 [cs.AI] Feb. 5, 2018.
Chen et al., Adaptive Mixture of Low-Rank Factorizations for Compact Neural Modeling, ICLR 2019 Conference Blind Submission, Sep. 2018.
Cheng et al, An Exploration of Parameter Redundancy in Deep Networks with Circulant Projections, arXiv:1502.03436v2 [cs.CV] Oct. 27, 2015.
Ding et al., CirCNN: Accelerating and Compressing Deep Neural Networks Using Block-Circulant Weight Matrices, arXiv:1708.08917v1 [cs.CV] Aug. 29, 2017.
Fu et al., Speed Reading: Learning to Read ForBackward via Shuttle, Proceedings of the 2018 Conference on Empirical Methods in Natural Language Processing, pp. 4439-4448, Brussels, Belgium, Oct.-Nov. 2018.
Gale et al., The State of Sparsity in Deep Neural Networks, arXiv:1902.09574v1 [cs.LG] Feb. 25, 2019.
Gope et al., Ternary Hybrid Neural-Tree Networks for Highly Constrained IoT Applications, shalarXiv:1903.01531v1 [cs.LG] Mar. 4, 2019.
Grachev et al., Neural Networks Compression for Language Modeling, arXiv:1708.05963v1 [stat.ML] Aug. 20, 2017.
Hubara et al., Quantized Neural Networks: Training Neural Networks with Low Precision Weights and Activations, arXiv:1609.07061v1 [cs.NE] Sep. 22, 2016.
Koutník et al., A Clockwork RNN, arXiv:1402.3511 v1 [cs.NE] Feb. 14, 2014.
Krueger et al., Zoneout: Regularizing RNNs by Randomly Preserving Hidden Activations, https://www.arxiv-vanity.com/papers/1606.01305/; CoRR, abs/1606.01305, 2016.
Lin et al., Neural Networks with Few Multiplications, arXiv:1510.03009v3 [cs.LG] Feb. 26, 2016.
Louizos et al., Learning Sparse Neural Networks through L0 Regularization, arXiv:1712.01312v2 [stat.ML] Jun. 22, 2018.
Neil et al., Phased LSTM: Accelerating Recurrent Network Training for Long or Event-based Sequences, arXiv:1610.09513v1 [cs.LG] Oct. 29, 2016.
Neklyudov et al., Structured Bayesian Pruning via Log-Normal Multiplicative Noise, arXiv:1705.07283v2 [stat.ML] Nov. 4, 2017.
Pascanu et al., On the difficulty of training recurrent neural networks, Proceedings of the 30th International Conference on International Conference on Machine Learning—vol. 28, ICML'13, pp. III-1310-III-1318, 2013.
Seo et al., Neural Speed Reading via Skim-RNN, arXiv:1711.02085v3 [cs.CL] Mar. 29, 2018.
Thakker et al., Compressing RNNs for IoT Devices by 15-38x using Kronecker Products, arXiv:1906.02876v5 [cs.LG] Jan. 31, 2020.
Thakker et al., Measuring scheduling efficiency of RNNs for NLP applications, arXiv:1904.03302v1 [cs.DC] Apr. 5, 2019.
Thakker et al., Run-time Efficient RNN Compression for Inference on Edge Devices, arXiv:1906.04886v3 [cs.LG] Jan. 5, 2020.
Tschannen et al., Strassennets: Deep Learning with a Multiplication Budget, Proceedings of the 35 th International Conference on Machine Learning, Stockholm, Sweden, PMLR 80, 2018.
Vanhoucke et al., Improving the speed of neural networks on CPUs, Deep Learning and Unsupervised Feature Learning Workshop, NIPS 2011, 2011.
Yu et al., Learning to Skim Text, arXiv:1704.06877v2 [cs.CL] Apr. 29, 2017.
Yu et al., Fast and accurate text classification: skimming, rereading and early stopping, ICLR 2018 Conference Blind Submission, 2018.
Zhu et al., To prune, or not to prune: exploring the efficacy of pruning for model compression, arXiv:1710.01878v2 [stat.ML] Nov. 13, 2017.
Zhu et al., Trained Ternary Quantization, arXiv:1612.01064v3 [cs.LG] Feb. 23, 2017.

* cited by examiner

|  | SST | | IMDB | |
|---|---|---|---|---|
|  | Acc (%) | Skip-Rate(%) | Acc (%) | Skip-Rate(%) |
| Baseline | 83.26 | - | 89 | - |
| Baseline with stop words removed | 80.26 | 30 | 87 | 42.05 |
| Baseline with concat(4) | 76.26 | 61.05 | 59 | 96.70 |
| Baseline with concat(10) | 81.68 | 18.73 | 66 | 91.76 |
| Baseline with concat(50) | 83.26 | 0 | 80.50 | 50.60 |

SKIP PREDICTOR FOR PRE-TRAINED RECURRENT NEURAL NETWORKS

CROSS-REFERENCE TO RELATED APPLICATIONS

This application claims priority to U.S. Provisional Patent Application Ser. No. 62/890,996, filed on Aug. 23, 2019, the content of which is hereby incorporated by reference in its entirety.

BACKGROUND

The present disclosure relates to computer systems. More particularly, the present disclosure relates to computer systems that include neural networks.

Artificial neural networks (ANNs), such as multilayer perceptrons (MLPs), convolutional neural networks (CNNs), recurrent neural networks (RNNs), etc., are a popular solution to a wide array of challenging classification and recognition tasks. RNNs are particularly suited for sequence prediction tasks that use historical sequence data to predict the next data value(s) in the sequence. RNNs may be used for natural language applications, such as, for example, sentiment analysis, speech recognition, reading comprehension, summarization and translation, etc., as well as certain image processing applications, such as, for example, image captioning, video classification, etc.

An RNN divides a time-series input into multiple time steps, individually processes each time step, updates an internal or hidden state vector at the end of each time step, and generates an output. For example, an RNN that performs sentiment analysis may divide a sentence into words, and then process each word individually. However, the RNN may not need to process all of the time steps in order to accurately determine the final output. For example, a binary predictor may be placed in front of an RNN to determine whether a particular time step should be processed or may be skipped. Unfortunately, the binary predictor and the RNN must be trained together, which has precluded the use of a binary predictor with an RNN that has already been trained, i.e., a pre-trained RNN.

DETAILED DESCRIPTION

Figure 1:
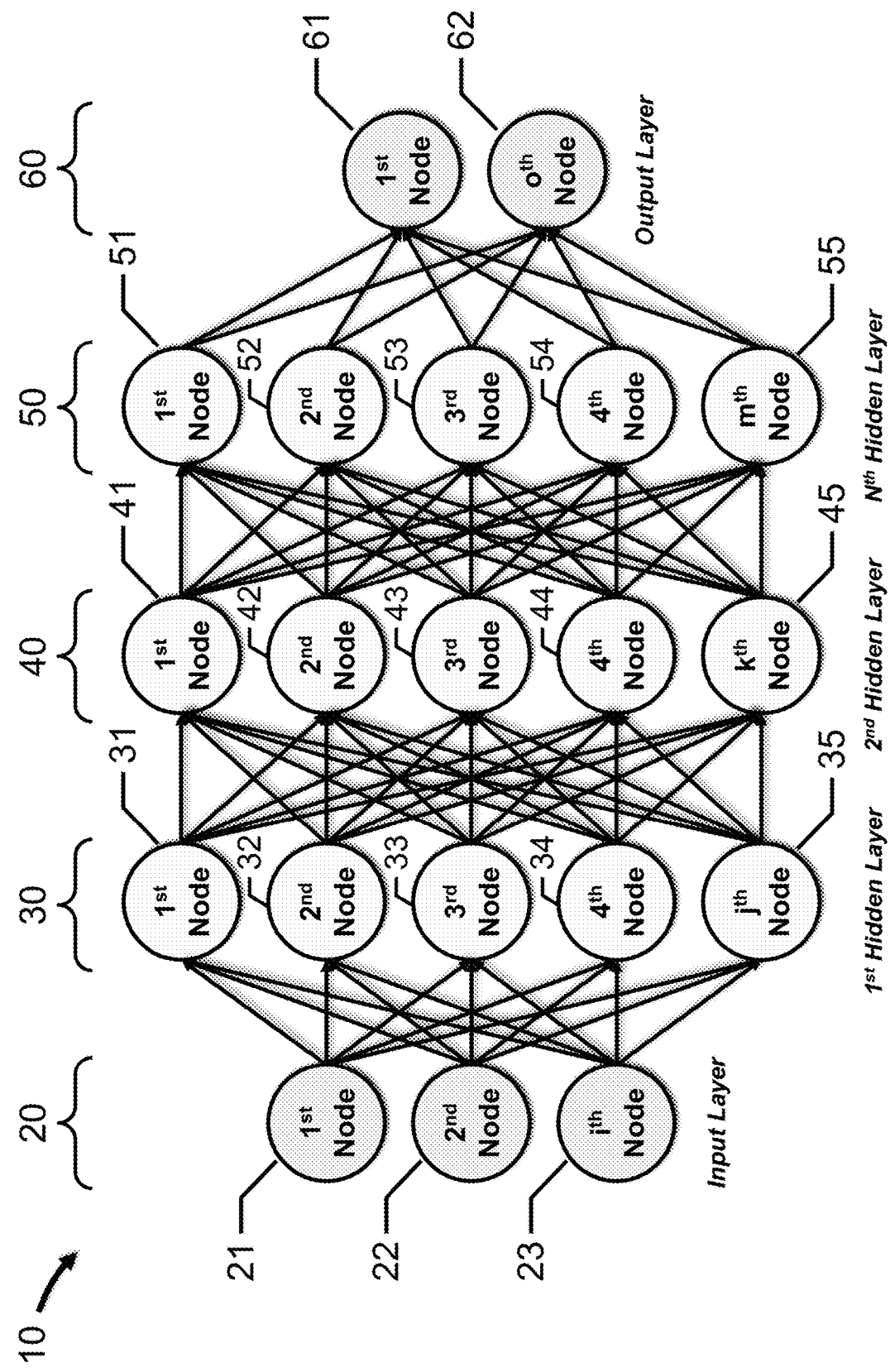
FIG. 1 depicts an ANN, in accordance with an embodiment of the present disclosure.

Embodiments of the present disclosure will now be described with reference to the drawing figures, in which like reference numerals refer to like parts throughout.

Embodiments of the present disclosure advantageously provide a skip predictor that decides whether a pre-trained RNN may skip any particular time step. Importantly, the skip predictor is trained independently from the pre-trained RNN, i.e., without training, retraining or fine-tuning the pre-trained RNN. Training, retraining or fine-tuning the pre-trained RNN includes adjusting the weights, biases, etc., of the RNN model.

In one embodiment, a baseline skip predictor, trained using the Internet Movie Database (IMDB) dataset, skips about 80% of the time steps of the pre-trained RNN model with an accuracy of about 88%. This RNN model was independently trained using the IMDB dataset.

In another embodiment, a baseline skip predictor, trained using the Stanford Sentiment Treebank (SST) dataset, skips about 45% of the time steps of the pre-trained RNN model with an accuracy of about 85%. This RNN model was independently trained using the SST dataset.

In a further embodiment, a skip predictor, using the SST dataset, skips about 20% of the time steps of the pre-trained RNN model with an accuracy of about 85%. This RNN model was independently trained using the SST dataset, and the skip predictor provides a computational savings of about 26%. Other datasets may be used to train the skip predictor, and provide similar advantageous results.

In one embodiment, a method for skipping RNN state updates using a skip predictor is provided. The system includes a processor, coupled to a memory, configured to execute a skip predictor and a pre-trained RNN model having a hidden state vector.

The skip predictor is configured to read the sequential input data from the memory; divide the sequential input data into a plurality of input data sequences, each input data sequence including a sequence of input data values, each input data value being associated with a different time step for the pre-trained RNN model; and, at each time step, receive the hidden state vector for a prior time step from the pre-trained RNN model, determine, based on the input data value and the hidden state vector for at least one prior time step, whether to provide or not provide the input data value associated with the time step to the pre-trained RNN model for processing, when so determined, provide the input data value associated with the time step to the pre-trained RNN model for processing, and when so determined, not provide the input data value associated with the time step to the pre-trained RNN model.

The RNN model is configured to for each input data value received from the skip predictor, process the input data value, and update the hidden state vector, and generate output data after a last input data value is processed.

The skip predictor is trained without retraining the pre-trained RNN model.

The memory may be configured to store the sequential input data, the output data, the skip predictor, and the pre-trained RNN model.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLu) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation signal value that is provided to the activation function for that node. The output of the activation function is then provided as an input data value to each output layer node. At each output layer node, the output data value received from each hidden layer node is multiplied by a respective connection weight, and the resulting products are summed or accumulated into an activation signal value that is provided to the activation function for that node. The output of the activation function is then provided as output data. Additional hidden layers may be similarly configured to process data.

FIG. 1 depicts an ANN, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2 (depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include CNNs, RNNs, long short-term memories (LSTMs), shallow neural networks, etc.

Figure 2:
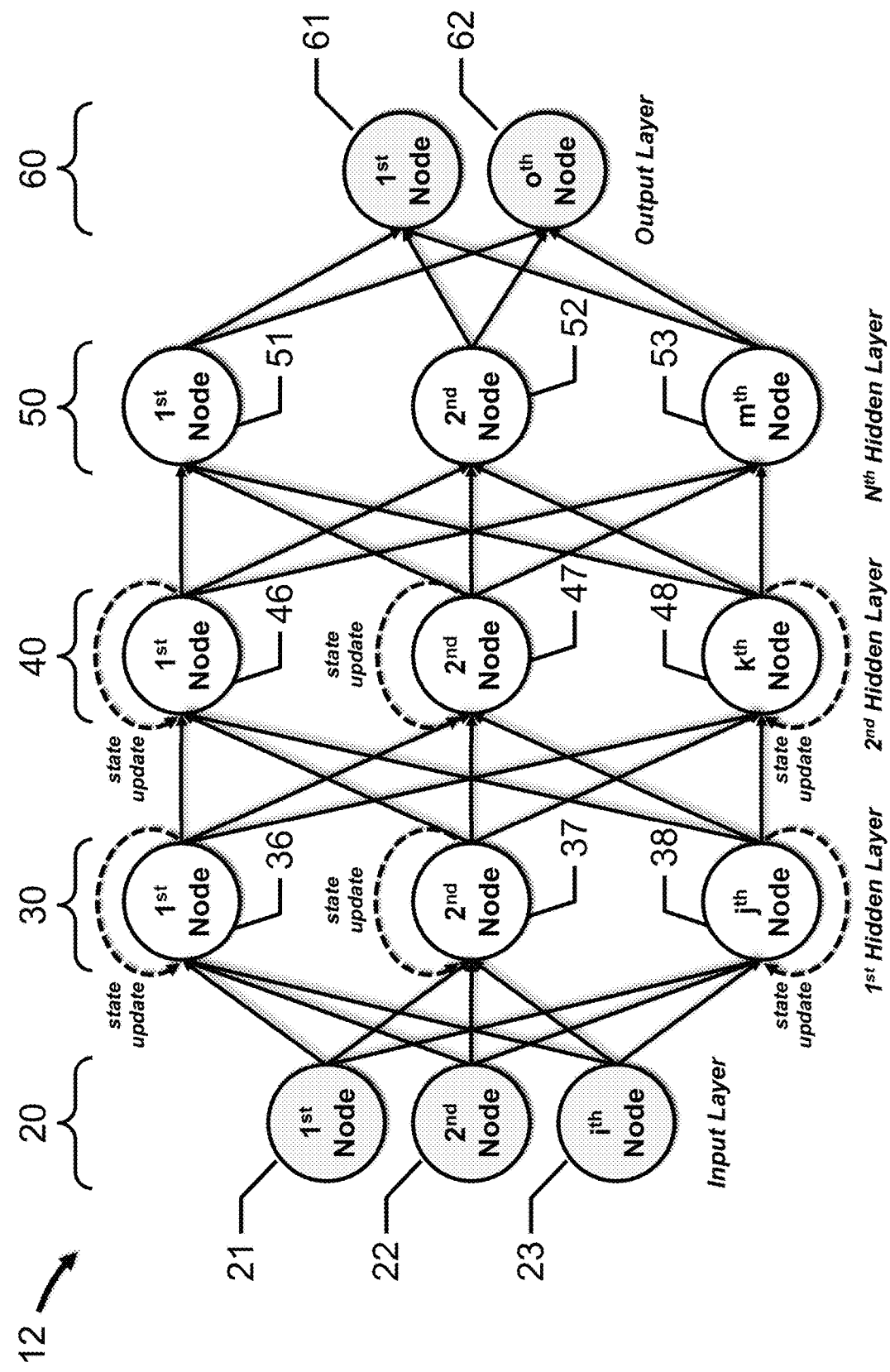
FIG. 2 depicts an RNN, in accordance with an embodiment of the present disclosure.

FIG. 2 depicts an RNN, in accordance with an embodiment of the present disclosure. Generally, RNNs process input sequence data and generate output sequence data, and may be used for many different applications, such as, for example, natural language processing applications (e.g., sentiment analysis, speech recognition, reading comprehension, summarization and translation, etc.), image processing (e.g., image captioning, video classification, etc.), etc. RNNs may be programmed to process many different types of input and output data, such as, for example, fixed input data and fixed output data for image classification, etc., fixed input data and sequential output data for image captioning, etc., sequential input data and fixed output data for sentence "sentiment" classification, etc., sequential input data and sequential output data for machine translation, etc., synced sequential input data and sequential output data for video classification, etc.

RNN 12 includes input layer 20, one or more hidden layers, such as recurrent layer 30, one or more additional recurrent layers 40, hidden layer 50, etc., and output layer 60. Generally, an RNN may include two to four hidden layers. Many other variations of input, hidden and output layers are contemplated.

Input layer 20 includes one or more input nodes 21, 22, 23, etc., that presents the input data, such as sequences of letters, words, sentences, etc., images, audio data, etc. to hidden layer 30.

Hidden layer 30 is a fully connected, recurrent layer that includes one or more recurrent nodes 36, 37, 38, etc. Each hidden (recurrent) node 36, 37, 38, etc. maintains a state for a hidden state vector (h) for this layer, which is updated at each time step (t) of RNN 12. In other words, the hidden state vector (h) includes an element for each recurrent node in recurrent layer 30, which is available to the other recurrent nodes in recurrent layer 30. In this sense, each recurrent node in recurrent layer 30 is connected to the other recurrent nodes in recurrent layer 30. In many embodiments, the size of the hidden state vector (h) ranges from several hundred to a few thousand, such as, for example, 128 to 4,096 elements. In certain embodiments, the hidden state vector (h) may be subsampled to reduce processing requirements.

Generally, the hidden state vector ($h_t$) may be updated by applying an activation function to the sum of the previous hidden state vector ($h_{t-1}$) multiplied by a weight vector ($W_{state}$) and the current input data ($x_t$) multiplied by another weight vector ($W_{input}$). The function may be a non-linear activation function, such as, for example, ReLu, tanh( ), etc., applied element-by-element. In certain embodiments, a bias may be added to the sum prior to the application of the activation function. The output of the recurrent nodes ($Y_t$) is the product of the hidden state vector multiplied by another weight vector ($W_{output}$).

One or more additional, fully-connected, hidden (recurrent) layers 40 may follow hidden (recurrent) layer 30, and may include one or more hidden (recurrent) nodes 46, 47, 48, etc., and a corresponding hidden state vector (h) for each hidden (recurrent) layer 40.

Hidden layer 50 is a fully-connected layer that includes one or more hidden nodes 51, 52, 53, etc. In certain embodiments, hidden layer 50 may be a classification layer.

Output layer 60 is a fully-connected layer that includes one or more output nodes 61, 62, etc. In certain embodiments, fully-connected output layer 60 may receive the classification results output by hidden layer 50, and each output node provides an output, such as a predicted class score, probability of a word, sentence, etc. A normalization function, such as a Softmax function, may be applied to the output by output layer 60, or, alternatively, by an additional layer interposed between hidden layer 50 and output layer 60.

Similar to ANNs, training an RNN includes optimizing the connection weights between nodes by minimizing the prediction error of the output data until the RNN achieves a particular level of accuracy. As noted above, backpropagation through time may be used to iteratively and recursively determines a gradient descent with respect to the weights, and then adjusts the weights to improve the performance of the RNN.

Figure 3:
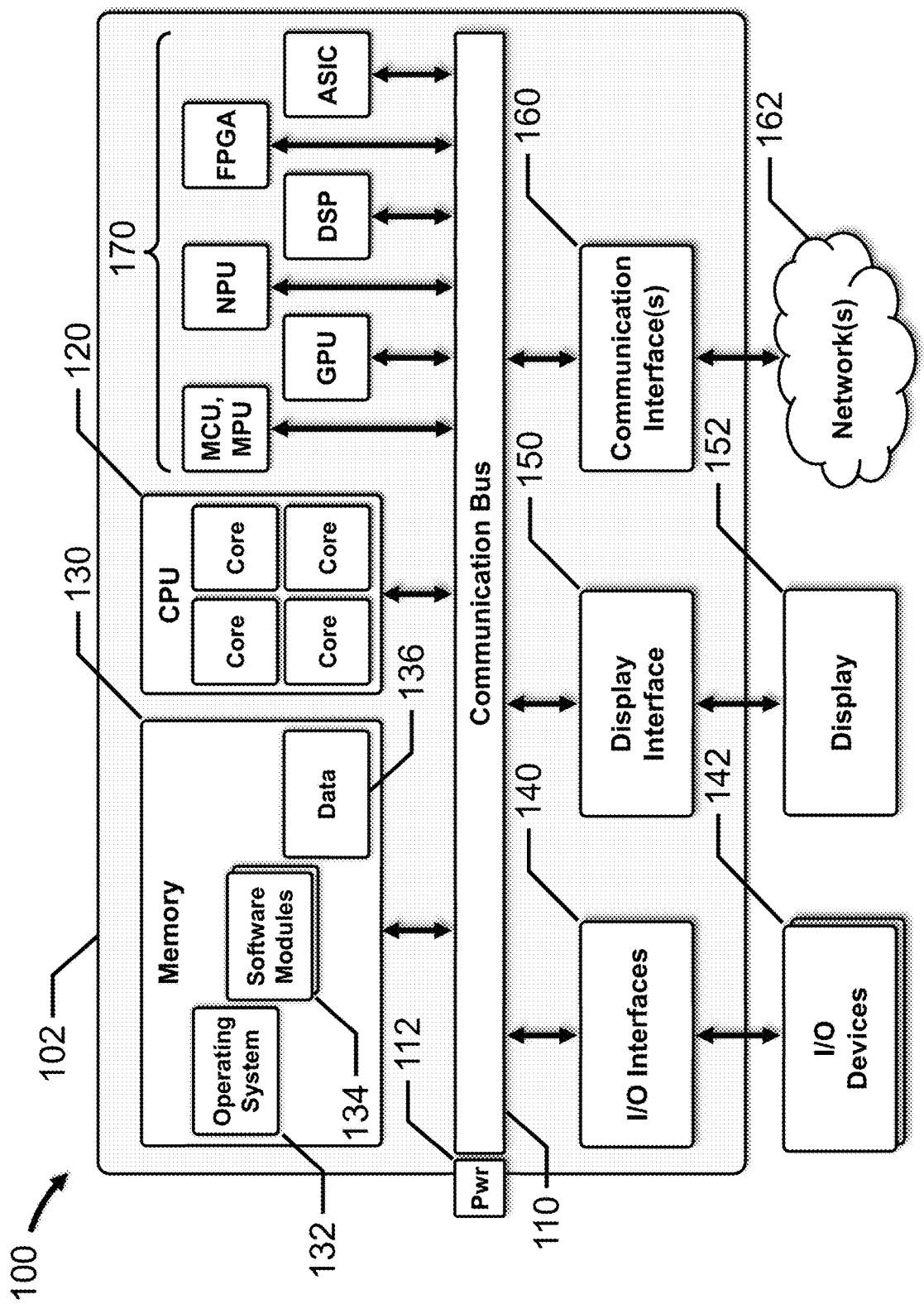
FIG. 3 depicts a block diagram of a system, in accordance with embodiments of the present disclosure.

FIG. 3 depicts a block diagram of system, in accordance with embodiments of the present disclosure.

System 100 includes communication bus 110 coupled to one or more processors 120, memory 130, I/O interfaces 140, display interface 150, one or more communication interfaces 160, and one or more HAs 170. Generally, I/O interfaces 140 are coupled to I/O devices 142 using a wired or wireless connection, display interface 150 is coupled to display 152, and communication interface 160 is connected to network 162 using a wired or wireless connection. In many embodiments, certain components of system 100 are implemented as a system-on-chip (SoC) 102; in other embodiments, system 100 may be hosted on a traditional printed circuit board, motherboard, etc.

Figure 4:
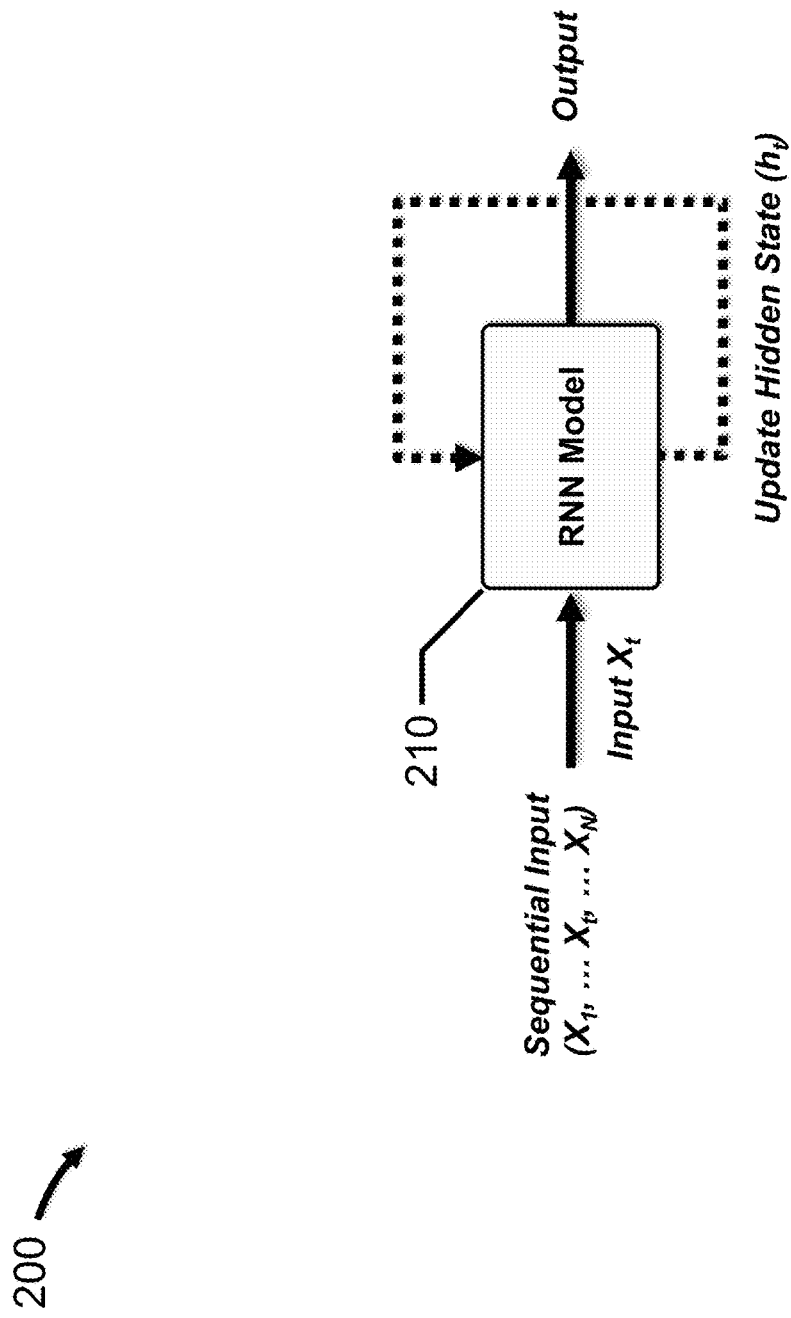
FIG. 4 depicts a data flow diagram for an RNN model, in accordance with an embodiment of the present disclosure.

Communication bus 110 is a communication system that transfers data between processor 120, memory 130, I/O interfaces 140, display interface 150, communication interface 160, HAs 170, as well as other components not depicted in FIG. 4. Power connector 112 is coupled to communication bus 110 and a power supply (not shown). In certain embodiments, communication bus 110 is a network-on-chip (NoC).

Processor 120 includes one or more general-purpose or application-specific microprocessors that executes instructions to perform control, computation, input/output, etc. functions for system 100. Processor 120 may include a single integrated circuit, such as a micro-processing device, or multiple integrated circuit devices and/or circuit boards working in cooperation to accomplish the functions of processor 120. Additionally, processor 120 may include multiple processing cores, as depicted in FIG. 4. Generally, system 100 may include one or more processors 120, each containing one or more processing cores.

For example, system 100 may include 2 processors 120, each containing multiple processing cores. In certain embodiments, the processors form a heterogeneous processing architecture, such as, for example, Arm's "big.LITTLE" architecture, that couples relatively battery-saving and slower processor cores ("LITTLE" cores) with relatively more powerful and power-hungry processing cores ("big" cores). For example, one processor 120 may be a high-performance processor containing 4 "big" processing cores, e.g., Arm Cortex-A73, Cortex-A75, Cortex-A76, etc., while the other processor 120 may be a high-efficiency processor containing 4 "little" processing cores, e.g., Arm Cortex-53, Arm Cortex-55, etc.

In many embodiments, processor 120 may also be configured to execute classification-based machine learning models, such as, for example, ANNs, DNNs, CNNs, RNNs, SVM, Naïve Bayes etc. In these embodiments, processor 120 may provide the same functionality as a hardware accelerator, such as HA 170.

In addition, processor 120 may execute computer programs or modules, such as operating system 132, software modules 134, etc., stored within memory 130. For example, software modules 134 may include an ML application, an ANN application, a DNN application, a CNN application, an RNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for system 100. Software modules 134 provide various functionality, such as image classification using convolutional neural networks, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to system 100 and/or output from system 100. As discussed above, I/O devices 142 are operably connected to system 100 using a wired and/or wireless connection. I/O devices 142 may include a local processor coupled to a communication interface that is configured to communicate with system 100 using the wired and/or wireless connection. For example, I/O devices 142 may include a keyboard, mouse, touch pad, joystick, etc.

Display interface 150 is configured to transmit image data from system 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

HAs 170 are configured to execute machine learning models, such as, for example, ANNs, CNNs, RNNs, etc., in support of various applications embodied by software modules 134. Generally, HA 170 includes one or more processors, coprocessors, processing engines (PEs), compute engines (CEs), etc., such as, for example, microcontroller units (MCUs), microprocessing units (MPUs), central processing units (CPUs), graphics processing units (GPUs), neural processing units (NPUs), such as, for example, the ARM Machine Learning (ML) Processor, digital signal processors (DSPs), field programmable gate arrays (FPGAs), application specific integrated circuits (ASICs), matrix multiplier circuits, multiply-and-accumulate (MAC) arrays, etc.

HAs 170 also include a communications bus interface as well as non-volatile and/or volatile memories, such as, for example, ROM, flash memory, SRAM, DRAM, etc. In certain embodiments, HAs 170 may store ANN models and weights in non-volatile memory, while in other embodiments, HAs 170 receive the ANN model and weights from memory 130 over communication bus 110 for storage in local volatile memory (e.g., local SRAM). In certain embodiments, the ANN model may be directly implemented in hardware using PEs, CEs, matrix multiplier units, MAC arrays, etc. Generally, HAs 170 receive input data from memory 130 over communication bus 110, and transmit output data to memory 130 over communication bus 110.

For example, the ARM ML Processor supports a variety of ANNs, including CNNs and RNNs, for classification, object detection, image enhancements, speech recognition and natural language understanding. The ARM ML Processor includes a control unit, a direct memory access (DMA) engine, local memory and 16 CEs. Each CE includes, inter alia, a MAC engine that performs convolution operations, a programmable layer engine (PLE), local SRAM, a weight decoder, a control unit, a direct memory access (DMA) engine, etc. Each MAC engine performs up to eight 16-wide dot products with accumulation. Generally, the PLE performs non-convolution operations, such as, for example, pooling operations, ReLU activations, etc. Each CE receives input feature maps (IFMs) and weights sets over the NoC and stores them in local SRAM. The MAC engine and PLE process the IFMs to generate the output feature maps (OFMs), which are also stored in local SRAM prior to transmission over the NoC.

FIG. 4 depicts data flow diagram 200 for RNN model 210, in accordance with an embodiment of the present disclosure. RNN model 210 has been pre-trained and is ready to perform inferences tasks.

RNN model 210 receives sequential input data, divides the sequential input data into multiple time steps ($x_1, \ldots, x_t, \ldots, x_N$), individually processes each time step (e.g., $x_t$), updates an internal or hidden state vector (e.g., $h_t$) at the end of each time step, and generates an output. For example, an RNN that performs sentiment analysis divides a sentence into words, and then processes each word individually.

As noted above, RNNs have shown state-of-the-art results for various applications. Though many of these applications run on mobile devices, they are typically enabled by querying a cloud-based system to do most of the computation. The energy, latency, and privacy implications associated with running a query on the cloud are changing where users run a neural network application. Accordingly, an increasing number of RNNs will be running on embedded devices in the future. Due to the energy and power constraints of edge devices, embedded system-on-chips (SoCs) frequently use lower bandwidth memory technologies and smaller caches compared to desktop and server processors. Generally, RNNs execute memory-bounded matrix vector operations during inference for each time step. If the RNN does not fit in the cache, the RNN will be read into the cache after every time step, leading to inefficient execution of RNNs.

As discussed above, not all of the RNN time steps are important. For example, in a sentiment analysis task, the sentiment for the statement "this movie is good" can be classified as positive without processing most of the words apart from "good." Similarly, opportunities for skipping RNN time steps also exist for speech recognition and time-series classification tasks. By skipping these unimportant RNN time steps, the computation required during inference is advantageously decreased, and the inefficiencies discussed above are also avoided.

A binary predictor controls the information provided to the RNN model by deciding which elements of a sequence should be input to the RNN model. However, during the training of the binary predictor, RNN model must be trained, retrained or fine-tuned in order to accommodate the strengths and weaknesses of each component. Because RNN models can be large and difficult to train, training, retraining or fine-tuning them to skip state updates may include tuning hyper-parameters using expensive processor clusters. Consequently, a typical consumer cannot receive the benefit of faster execution using binary predictors with pre-trained RNN models that are open source, provided as a cloud-based service, etc.

Embodiments of the present disclosure advantageously provide a skip predictor that decides whether a pre-trained RNN may skip any particular time step. Importantly, the skip predictor is trained independently from the pre-trained RNN, i.e., without the need to train, retrain or fine-tune the pre-trained RNN. Training, retraining or fine-tuning the pre-trained RNN involves adjusting the weights, biases, etc., of the RNN model.

This novel framework may be used by any consumer of pre-trained RNN models, cloud-based service providers, etc. For example, Internet of Things (IoT) service providers may use this novel framework to accelerate RNN inference on edge devices, as and when the end device consumes enough data. In other words, embodiments of the present disclosure provide the benefits of skipping redundant or non-useful elements of a sequence to increase the performance of a pre-trained RNN model without paying the cost of training, retraining or fine-tuning the pre-trained RNN model.

Figure 5A:
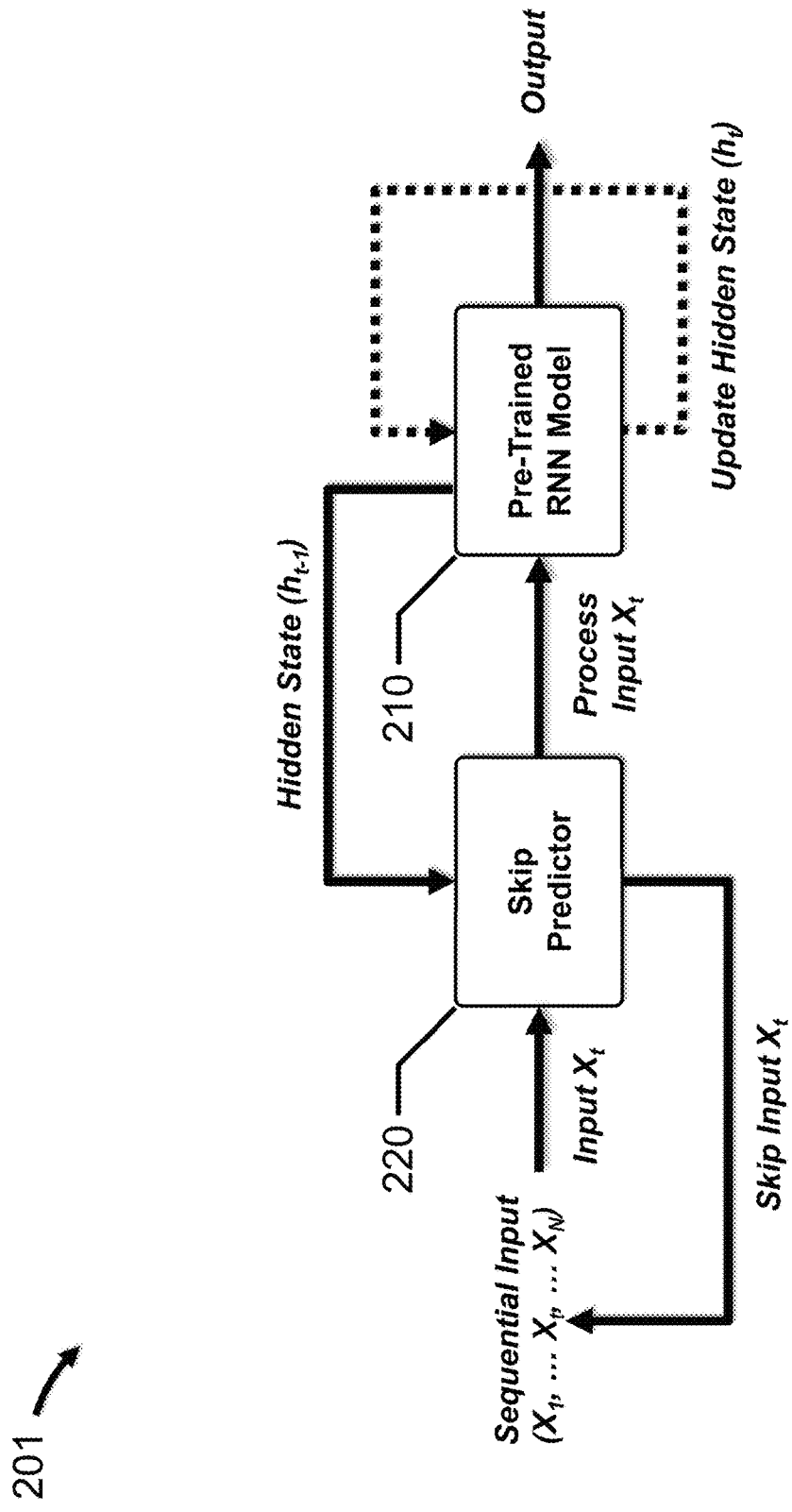
FIG. 5A depicts a data flow diagram for an RNN model with a skip predictor, in accordance with an embodiment of the present disclosure.

FIG. 5A depicts data flow diagram 201 for RNN model 210 with skip predictor 220, in accordance with an embodiment of the present disclosure. RNN model 210 is pre-trained and ready to perform inference tasks, while skip predictor 230 has been trained independently from RNN model 210. In this embodiment, RNN model 210 has a single hidden layer; other embodiments may include 2 to 4 hidden layers, 5 to 10 hidden layers, etc.

Skip predictor 220 receives sequential input data, and divides the sequential input data into a sequence of input data values $(x_1, \ldots, x_t, \ldots, x_N)$, each input data value being associated with a different time step for RNN model 210. At each time step t, skip predictor 220 receives a hidden state vector $h_{t-1}$ from RNN model 210, and determines whether input $x_t$ should be processed by RNN model 210 or skipped (i.e., not provided) based on $x_t$ and the hidden state vector $h_{t-1}$ for the prior time step t−1.

If skip predictor 220 determines that $x_t$ should be processed by RNN model 210, skip predictor 220 provides $x_t$ to RNN model 210 for processing. For each input $x_t$ that is provided by skip predictor 220, RNN model 210 processes the input $x_t$, updates the hidden state vector $h_t$ at the end of time step t, and generates an output.

Conversely, if skip predictor 220 determines that $x_t$ should be skipped (i.e., not provided), skip predictor 220 then determines whether input $x_{t+1}$ should be processed by RNN model 210 or skipped based on $x_{t+1}$ and the hidden state vector $h_{t-1}$, and so on. For each input $x_t$ that is not provided (i.e., skipped) by skip predictor 220, RNN model 210 does not process the input $x_t$ and does not update the hidden state vector $h_t$ at the end of time step t.

In certain embodiments, pre-trained RNN model 210 and skip predictor 220 may be stored on, and executed by HA 170. In these embodiments, input data are transferred from memory 130 to HA 170 over communication bus 110. In other embodiments, pre-trained RNN model 210 and skip predictor 220 are stored in memory 130, and transferred over communication bus 110 to HA 170 for storage and execution. In these embodiments, input data are transferred from memory 130 to HA 170 over communication bus 110. In further embodiments, pre-trained RNN model 210 and skip predictor 220 are stored in memory 130 and executed by processor 120.

Figure 5B:
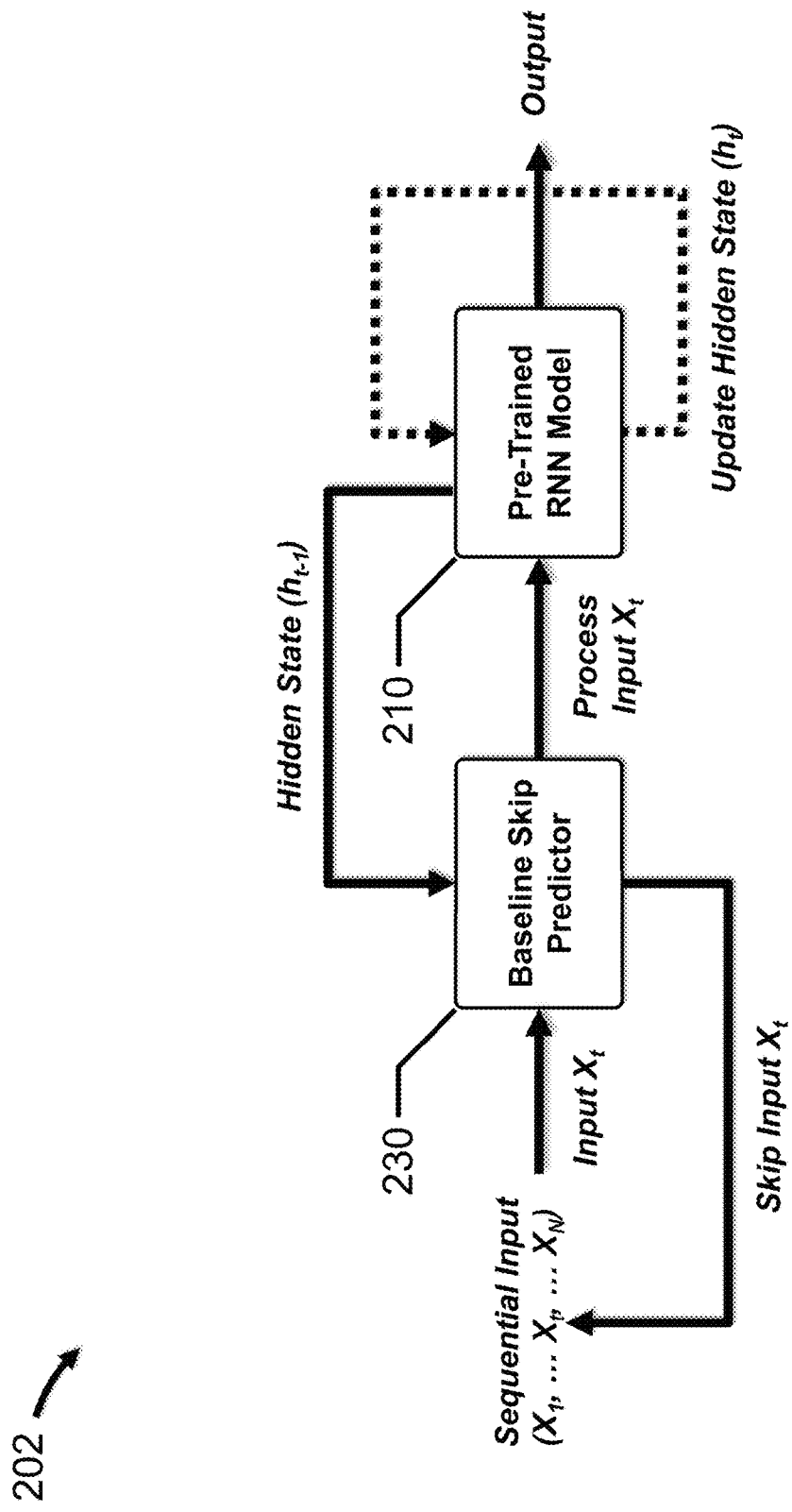
FIG. 5B depicts a data flow diagram for an RNN model with a baseline skip predictor, in accordance with an embodiment of the present disclosure.

FIG. 5B depicts data flow diagram 202 for RNN model 210 with baseline skip predictor 230, in accordance with an embodiment of the present disclosure. RNN model 210 has been pre-trained and is ready to perform inference tasks, while baseline skip predictor 230 has been trained independently from RNN model 210.

In certain embodiments, skip predictor 220 may be an ideal or "baseline" skip predictor 230 that determines whether the current input element $x_t$ of the input sequence, once processed, will produce a significant change in the hidden state vector $h_{t-1}$ of RNN model 210. At each time step t, baseline skip predictor 230 computes an updated hidden state vector $h_t$ of RNN model 210, based on $x_t$ and the hidden state vector $h_{t-1}$, and then determines whether to discard the updated hidden state vector $h_t$ or retain it based on a skip-criterion and a threshold. Generally, the skip-criterion measures the difference between hidden state vectors $h_t$ and $h_{t-1}$.

In one embodiment, the skip-criterion may be determined using a cosine distance given by Equation 1.

$$C_t = 1 - \cos(h_{t-1}, h_t) = 1 - \frac{h_{t-1} \cdot h_t}{\|h_{t-1}\|\|h_t\|} \qquad \text{Eq. 1}$$

In another embodiment, the skip-criterion may be determined using an $L_2$ norm distance given by Equation 2.

$$N_t = \|h_t - h_{t-1}\| \qquad \text{Eq. 2}$$

The cosine distance focuses on the orientation, while the $L_2$ norm distance focuses on the magnitude, which provides two interpretations for hidden state vector changes. Accordingly, an input $x_t$ that leads to a change in the hidden state vector that is less than a threshold is skipped, while an input $x_t$ that does not is provided to RNN model 210. Because baseline skip predictor 230 computes an updated hidden state vector $h_t$ of RNN model 210, based on $x_t$ and the hidden state vector $h_{t-1}$, baseline skip predictor 230 may be considered to be a smaller version of RNN model 210.

However, the selection of a threshold is not obvious. After a benchmark training dataset is selected, the hidden state vector transitions for every element of every input sequence is calculated. Next, the statistical distributions of cosine distances and $L_2$ norm distances of these hidden state vector transitions are analyzed, and a range of threshold values that commonly occur for the benchmark training dataset are determined.

In another embodiment, a threshold may be found by simply training an ANN predictor that is integrated with a pretrained RNN. During training, the gradients to the pre-trained RNN are blocked, which ensures that the pretrained RNN does not change. Because the ANN predictor is making decisions, back-propagation may be difficult, so reinforcement learning may be used to train the ANN predictor or Gumbel Softmax may be used to make decisions by the ANN predictor. An ANN predictor that is trained in this manner can advantageously learn its own notion of distance metric and threshold.

Once a range of threshold values and the skip-criterion are determined, baseline skip predictor 230 may be used determine the impact of skipping input elements by calculating the accuracy, the overall skip rate (i.e., the ratio between the number of skipped input steps and the total number of input steps), and the average skip-rate of each input sequence of the benchmark training dataset. For example, one embodiment of a sentiment analysis benchmark may be trained on the SST dataset, while another embodiment of the sentiment analysis benchmark may be trained on the IMDB dataset.

Figure 5C:
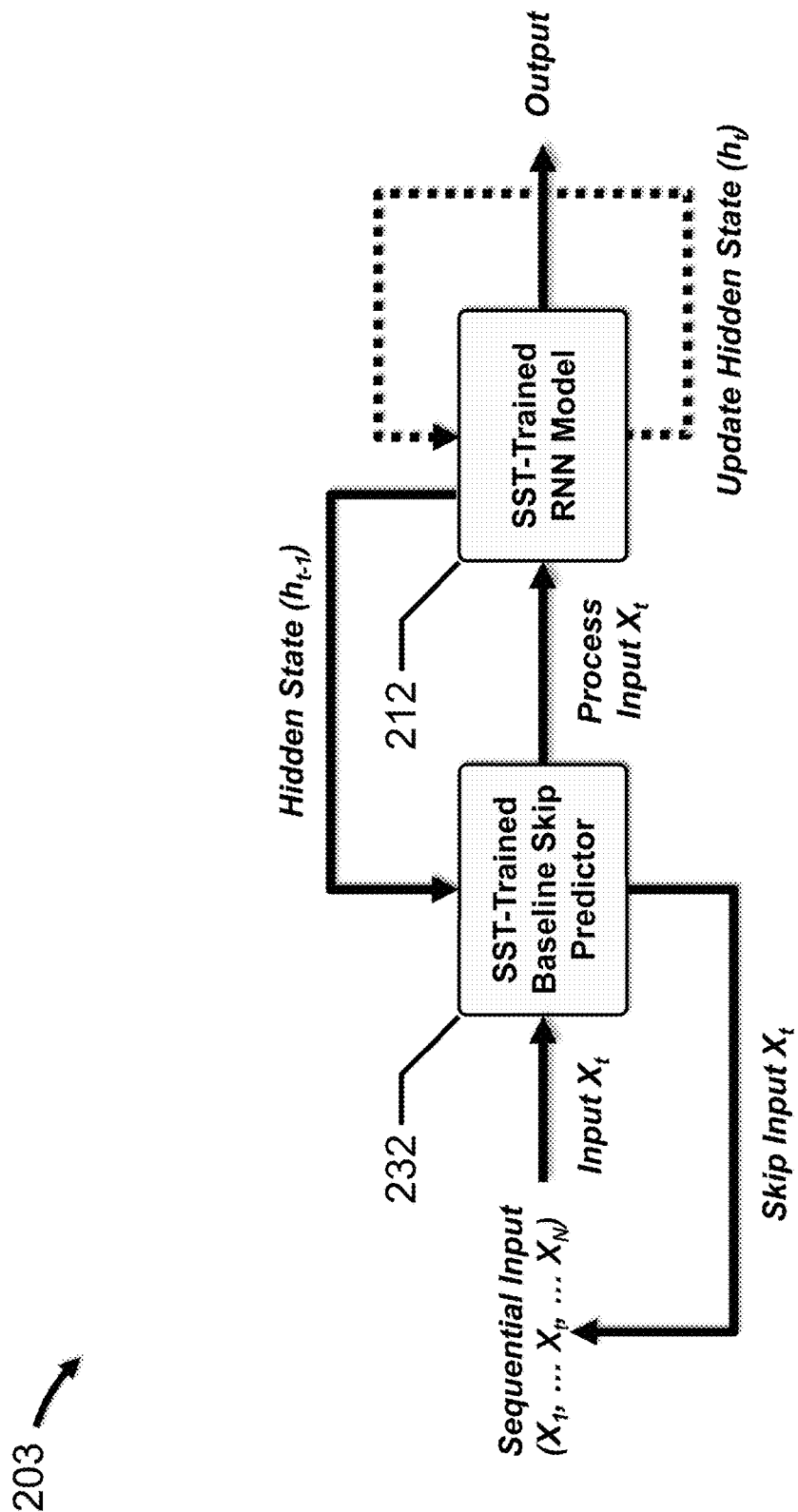
FIG. 5C depicts a data flow diagram for an RNN model with a baseline skip predictor, in accordance with an embodiment of the present disclosure.

FIG. 5C depicts data flow diagram 203 for RNN model 212 with baseline skip predictor 232, in accordance with an embodiment of the present disclosure. RNN model 212 has been pre-trained on the SST dataset and is ready to perform inference tasks, while baseline skip predictor 232 has been trained based on the SST dataset.

Figure 5D:
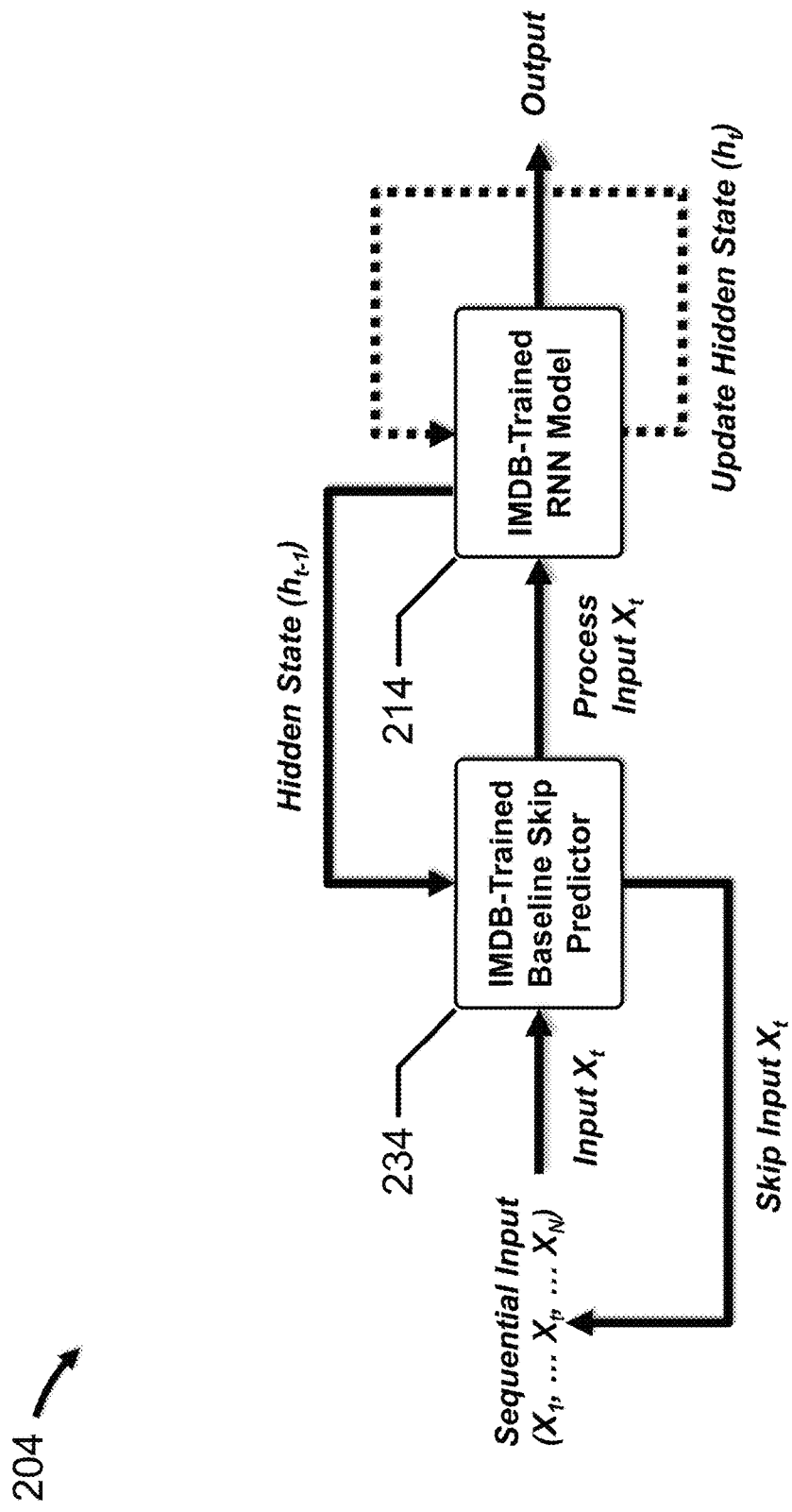
FIG. 5D depicts a data flow diagram for an RNN model with a baseline skip predictor, in accordance with an embodiment of the present disclosure.

FIG. 5D depicts data flow diagram 204 for RNN model 214 with baseline skip predictor 234, in accordance with an embodiment of the present disclosure. RNN model 214 has been pre-trained to the IMDB dataset and is ready to perform inference tasks, while baseline skip predictor 234 has been trained based on the IMDB dataset.

Figure 6A:
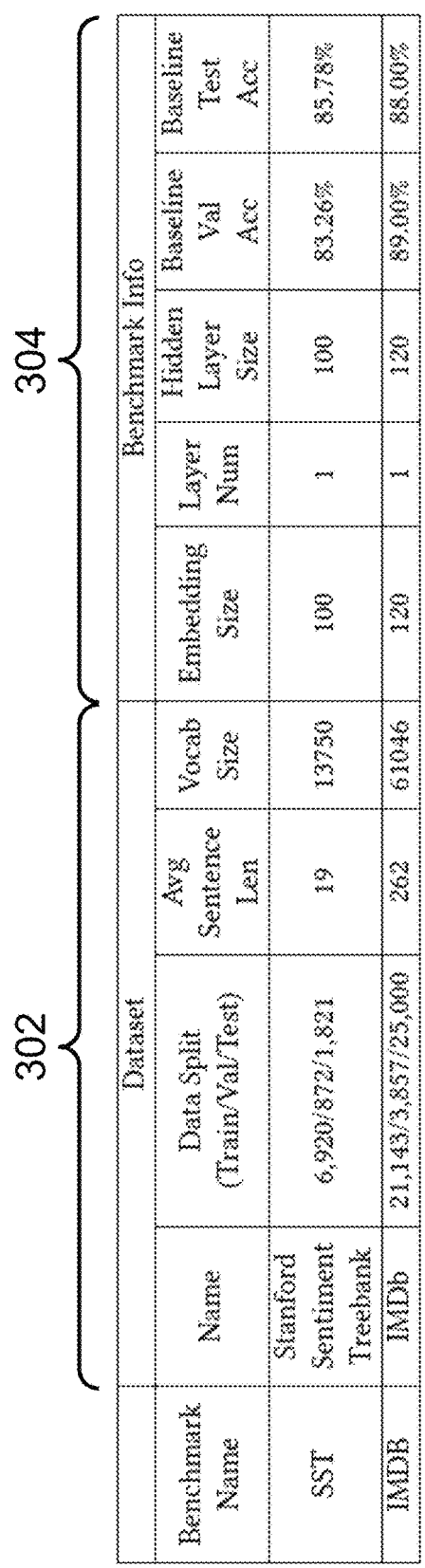
FIG. 6A depicts a table summarizing dataset information and benchmark information, in accordance with embodiments of the present disclosure.

FIG. 6A depicts table 300 summarizing dataset information 302 for the SST and IMBD datasets, as well as benchmark information 304 for RNN models 212, 214, in accordance with embodiments of the present disclosure.

Dataset information 302 describes the SST and IMDB datasets, and includes the data split between training, validation and testing, the average sentence length, and the vocabulary size. Benchmark information 304 describes the architecture and performance of RNN models 212, 214, and includes the embedding size, the number of layers, the hidden layer size, the validation accuracy and the test accuracy.

To evaluate the performance of baseline skip predictor 232, each element of each input sequence in the SST dataset is provided to baseline skip predictor 232. As described above, baseline skip predictor 232 determines whether the current input element $x_t$ of the input sequence, once processed, will produce a significant change in the hidden state vector $h_{t-1}$ of RNN model 212. At each time step t, baseline skip predictor 232 computes an updated hidden state vector $h_t$ of RNN model 212, based on $x_t$ and the hidden state vector $h_{t-1}$, and then determines whether to discard the updated hidden state vector $h_t$ or retain it based on a skip-criterion and a threshold. An input $x_t$ that leads to a change in the hidden state vector that is less than a threshold is skipped, while an input $x_t$ that does not is provided to RNN model 212. Then, the overall skipping rate, the average skipping rate and the accuracy of the integrated model are determined.

Figure 6B:
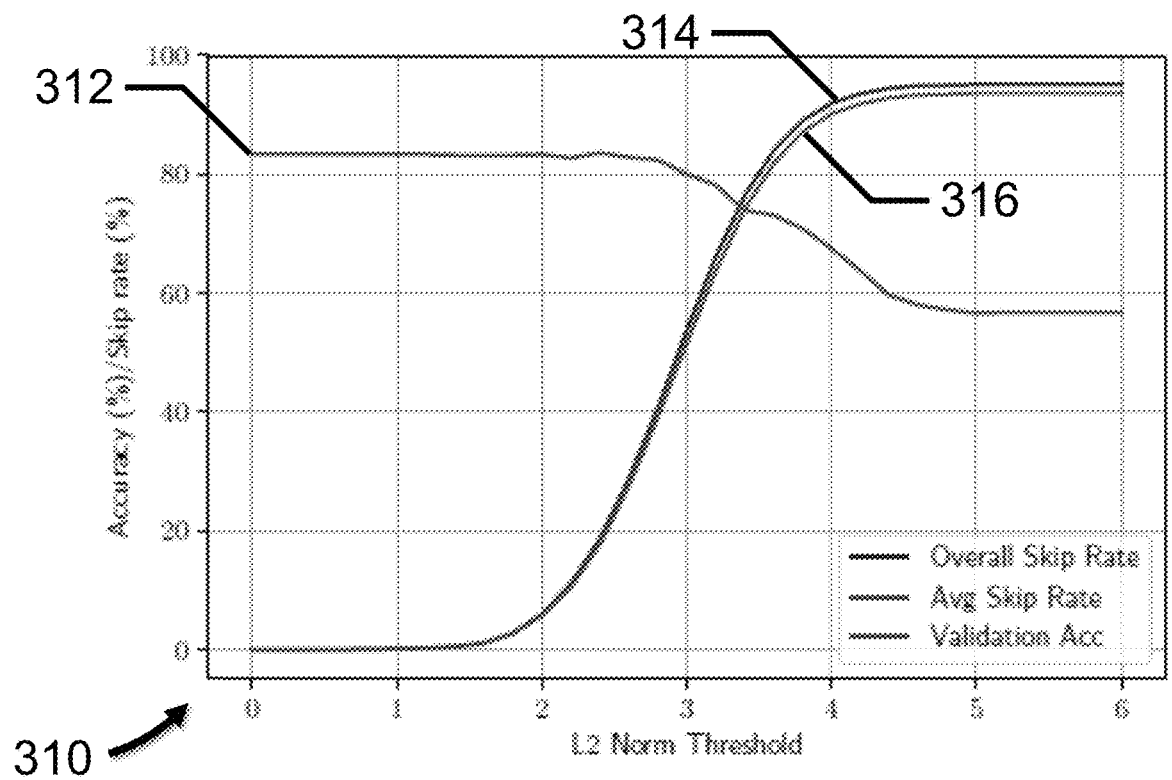
FIG. 6B presents a graph showing the performance of a baseline skip predictor trained using the SST dataset for different $L_2$ norm distance thresholds, in accordance with an embodiment of the present disclosure.

FIG. 6B presents graph 310 showing the performance of baseline skip predictor 232 trained using the SST dataset for different $L_2$ norm distance thresholds, in accordance with an embodiment of the present disclosure. Overall skip rate 312, average skip rate 314 and validation accuracy 316 are depicted.

Figure 6C:
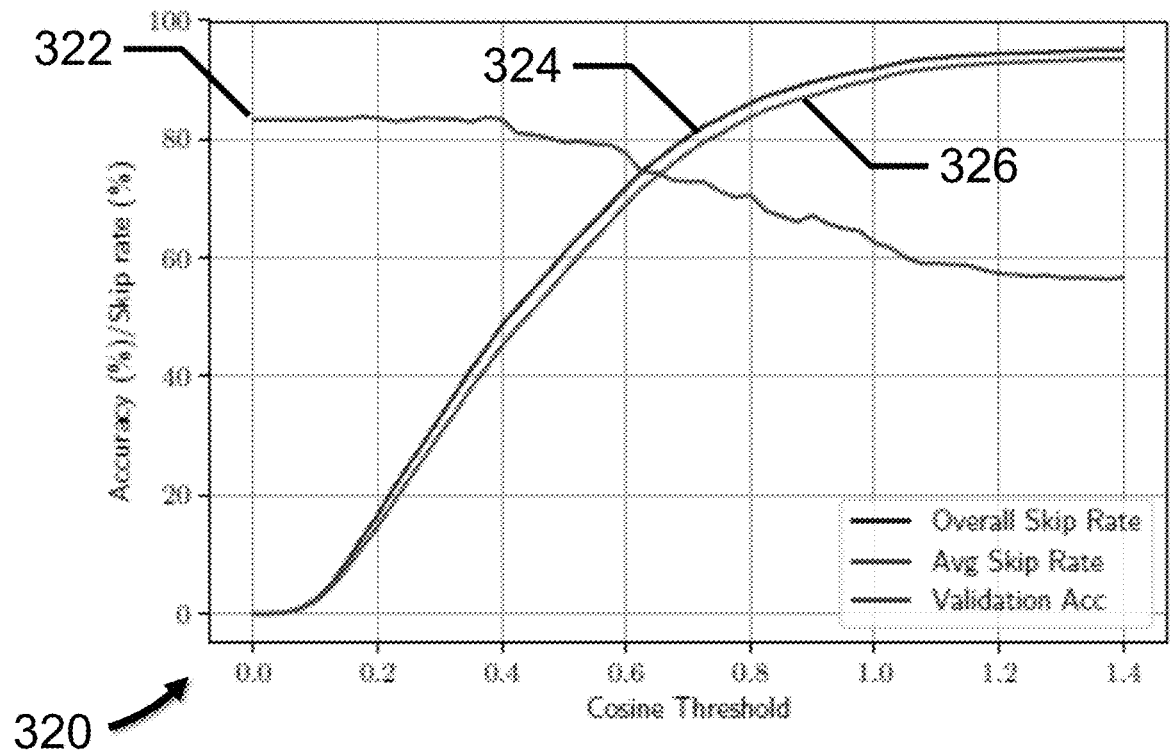
FIG. 6C presents a graph showing the performance of a baseline skip predictor trained using the SST dataset for different cosine distance thresholds, in accordance with an embodiment of the present disclosure.

FIG. 6C presents graph 320 showing the performance of baseline skip predictor 232 trained using the SST dataset for different cosine distance thresholds, in accordance with an embodiment of the present disclosure. Overall skip rate 322, average skip rate 324 and validation accuracy 326 are depicted.

To evaluate the performance of baseline skip predictor 234, each element of each input sequence in the IMDB dataset is provided to baseline skip predictor 234. As described above, baseline skip predictor 234 determines whether the current input element $x_t$ of the input sequence, once processed, will produce a significant change in the hidden state vector $h_{t-1}$ of RNN model 214. At each time step t, baseline skip predictor 234 computes an updated hidden state vector $h_t$ of RNN model 214, based on $x_t$ and the hidden state vector $h_{t-1}$, and then determines whether to discard the updated hidden state vector $h_t$ or retain it based on a skip-criterion and a threshold. An input $x_t$ that leads to a change in the hidden state vector that is less than a threshold is skipped, while an input $x_t$ that does not is provided to RNN model 214. Then, the overall skipping rate, the average skipping rate and the accuracy of the integrated model are determined.

Figure 6D:
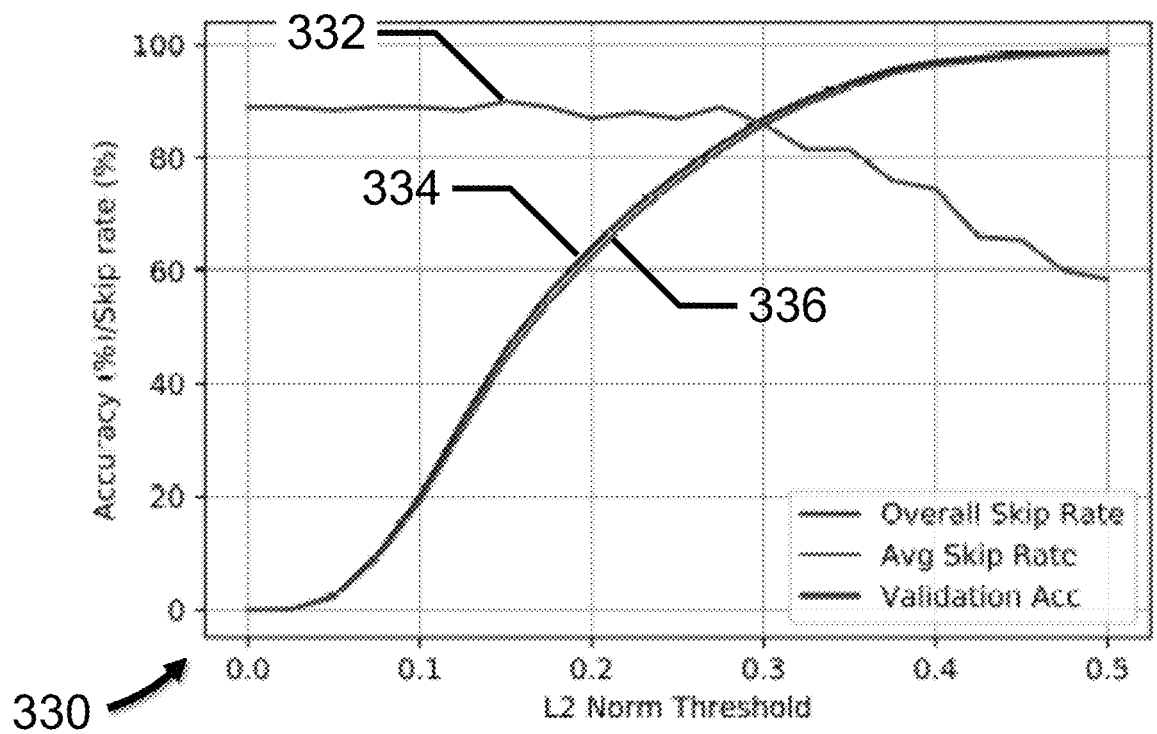
FIG. 6D presents a graph showing the performance of a baseline skip predictor trained using the IMDB dataset for different $L_2$ norm distance thresholds, in accordance with an embodiment of the present disclosure.

FIG. 6D presents graph 330 showing the performance of baseline skip predictor 234 trained using the IMDB dataset for different $L_2$ norm distance thresholds, in accordance with an embodiment of the present disclosure. Overall skip rate 332, average skip rate 334 and validation accuracy 336 are depicted.

Figure 6E:
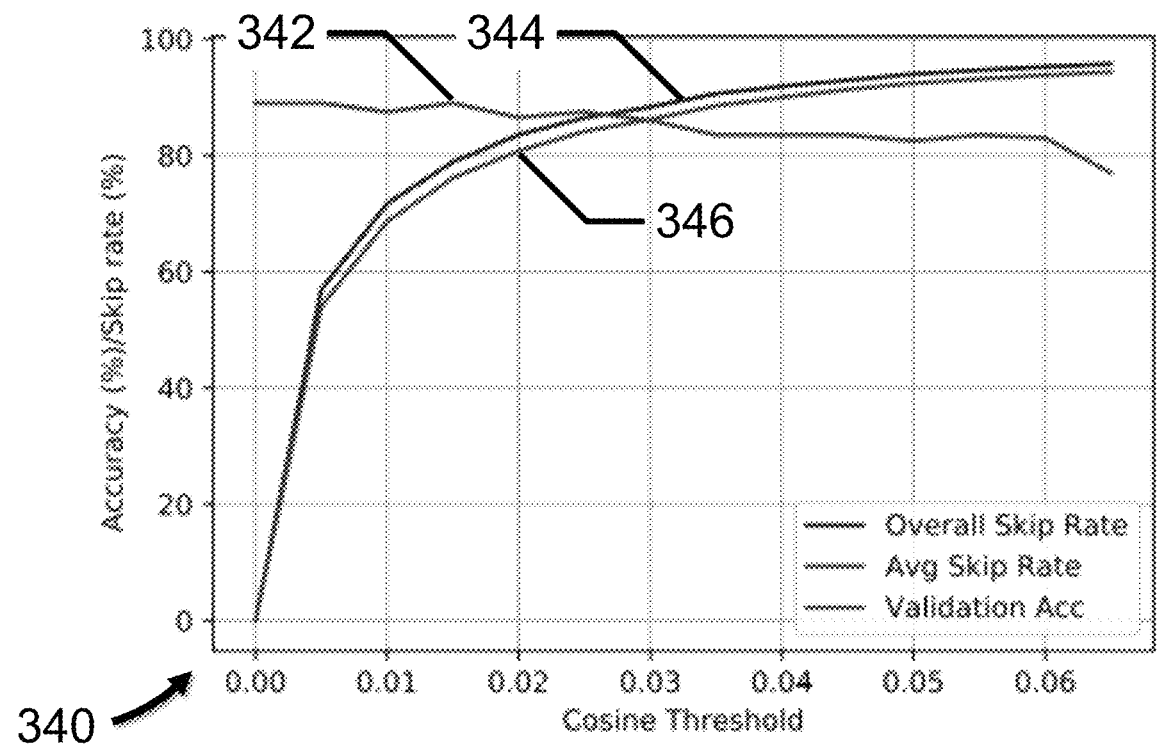
FIG. 6E presents a graph showing the performance of a baseline skip predictor trained using the IMDB dataset for different cosine distance thresholds, in accordance with an embodiment of the present disclosure.

FIG. 6E presents graph 340 showing the performance of baseline skip predictor 234 trained using the IMDB dataset for different cosine distance thresholds, in accordance with an embodiment of the present disclosure. Overall skip rate 342, average skip rate 344 and validation accuracy 346 are depicted.

FIGS. 6B, 6C, 6D and 6E demonstrate, generally, that a baseline skip predictor that skips hidden state vector updates without training, retraining or fine tuning the pre-trained RNN model only suffers minimal accuracy degradation, and that a baseline skip predictor typically performs well if the cosine distance threshold, rather than the $L_2$ norm distance threshold, is used because the cosine distance threshold affords a higher skip-rate with minimal loss in accuracy. Other distance metrics are also contemplated by the present disclosure.

For example, FIG. 6C shows that up to 45% of the time steps may be skipped with minimal loss in accuracy for the SST dataset, while FIG. 6E shows that up to skip 80% of the time steps may be skipped with minimal loss in accuracy for the IMDB dataset.

Figure 7:
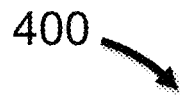
FIG. 7 depicts a table summarizing the accuracy and skip rate for different modifications of two baseline skip predictors, in accordance with embodiments of the present disclosure.

FIG. 7 depicts table 400 summarizing the accuracy and skip rate for different modifications of baseline skip predictors 232, 234, in accordance with embodiments of the present disclosure.

In certain embodiments, baseline skip predictors 232, 234 may be modified to remove words that do not convey any emotions from a sentence (i.e., stop words). In one embodiment, the natural language toolkit (NLTK) corpus dictionary of stop-words may be reduced to a list of 35 words, for example, by removing words such as "don't" and "not." The stop-words are removed from the input sequences in the SST and IMDB validation datasets. As depicted in table 400, for the SST validation set, the modified baseline skip predictor 232 skips 30% of the total words, with a drop in accuracy of 3.0% compared to the unmodified baseline skip predictor 232. For the IMDB validation set, the modified baseline skip predictor 234 skips 42% of the total words, with a drop in accuracy of 2.0% compared to the unmodified baseline skip predictor 234.

In other embodiments, baseline skip predictors 232, 234 may be modified to focus only on the first and last part of an input sequence (i.e., first n words, last n words). These embodiments capture the tendencies in writing to express the overall sentiment in the beginning and ending of a passage or sentence, while the middle portion focuses on other details which are not required to understand the sentiment of the passage or sentence. As depicted in table 400, the accuracy and skipping rate for n equal to 4, 10 and 50 are presented for both the SST dataset and the IMDB dataset.

The baseline skip predictors 230, 232, 234 described above compute the state vector update, determine if the state vector update meets a threshold criterion and then decide whether to skip the state vector update.

Advantageously, as discussed above, embodiments of the present disclosure also provide skip predictor 220 that determines whether to skip the RNN time step without computing the hidden state vector update ($h_t$). In these embodiments, skip predictor 220 may be a traditional machine learning model, such as a logistic regression (LR) or random forest (RF) classifier, an ANN model, such as shallow neural network with one or two hidden layers, etc., a hash table, etc. Other machine learning and ANN models are also contemplated.

As discussed above, at every time step, skip predictor 220 receives the current element of the input sequence ($x_t$) and the hidden state vector from the previous time step ($h_{t-1}$), and generates an output $y_t$ (0 or 1). When $y_t=1$, skip predictor 220 provides the current element of the input sequence ($x_t$) to RNN model 210. Conversely, when $y_t=0$, skip predictor 220 does not provides the current element of the input sequence ($x_t$) to RNN model 210.

In other embodiments, skip predictor 220 may be trained using a training dataset that is based on the original training dataset that was used to train RNN model 210. The original training dataset is divided into training sequences which are provided as input data to RNN model 210. Each training sequence includes a sequence of training data values, and each training data value ($x_t$) is associated with a different time step (t). After RNN model 210 processes each time step of each sequence, the vectors $x^i_t$, $h^i_t$ and $h^i_{t-1}$ are stored as a time step data set, where "i" is the $i^{th}$ sequence in the training set and t is the current time step within the sequence.

After RNN model 210 has completed processing the original training dataset, the difference between the hidden state vectors $h^i_t$ and $h^i_{t-1}$ for each time step data set is quantized to a numerical value using a distance metric, as discussed above, and a label is created based on this numerical value and a threshold. The threshold may be determined based on one or more considerations, such as accuracy, performance, skipping percentage, etc., or the threshold may be selected from a range of thresholds, as described above. If the quantized value is greater than the threshold, the time step is labeled as 1; otherwise, this time step is labeled as 0. The training dataset for skip predictor 220 include features and associated labels; each feature is a concatenation of the training data value ($x_t$) and the hidden state vector ($h^i_t$) for a particular time step of a particular sequence, and the associated label for each feature is 1 or 0.

In one embodiment, RNN model 210 is trained using the SST dataset, while skip predictor 220 is trained using a training dataset that is based on the SST dataset, as described above. The accuracy of the integrated system on the inference task as well as the reduction in MAC operations are measured, and the reduction in MAC operations is given by Equation 3.

$$E = \frac{MAC_{RNN}}{MAC_{predictor} + (1 + \alpha) * MAC_{RNN}} \quad \text{Eq. 3}$$

In Equation 3, E denotes the fraction of MAC operations reduced, n denotes the total number of input steps, a denotes the overall skipping rate (the ratio between the total number of skipped input steps and the total number of input steps), $MAC_{predictor}$ and $MAC_{RNN}$ denote the total number of MAC operations of skip predictor 220 and RNN model 210, respectively. Values of E>1 denote a reduction in the number of MAC operations.

In one embodiment, skip predictor 220 is a Logistic Regression classifier trained on the SST dataset that has a test accuracy of about 74%, which may suggest possible difficulties in recognizing the pattern of important input steps, leading to difficulties in distinguishing the unimportant steps to skip from important ones to keep. In another embodiment, skip predictor 220 is a Random Forrest classifier trained on the SST dataset that has a test accuracy of about 82% for E values of 1.04.

Figure 8:
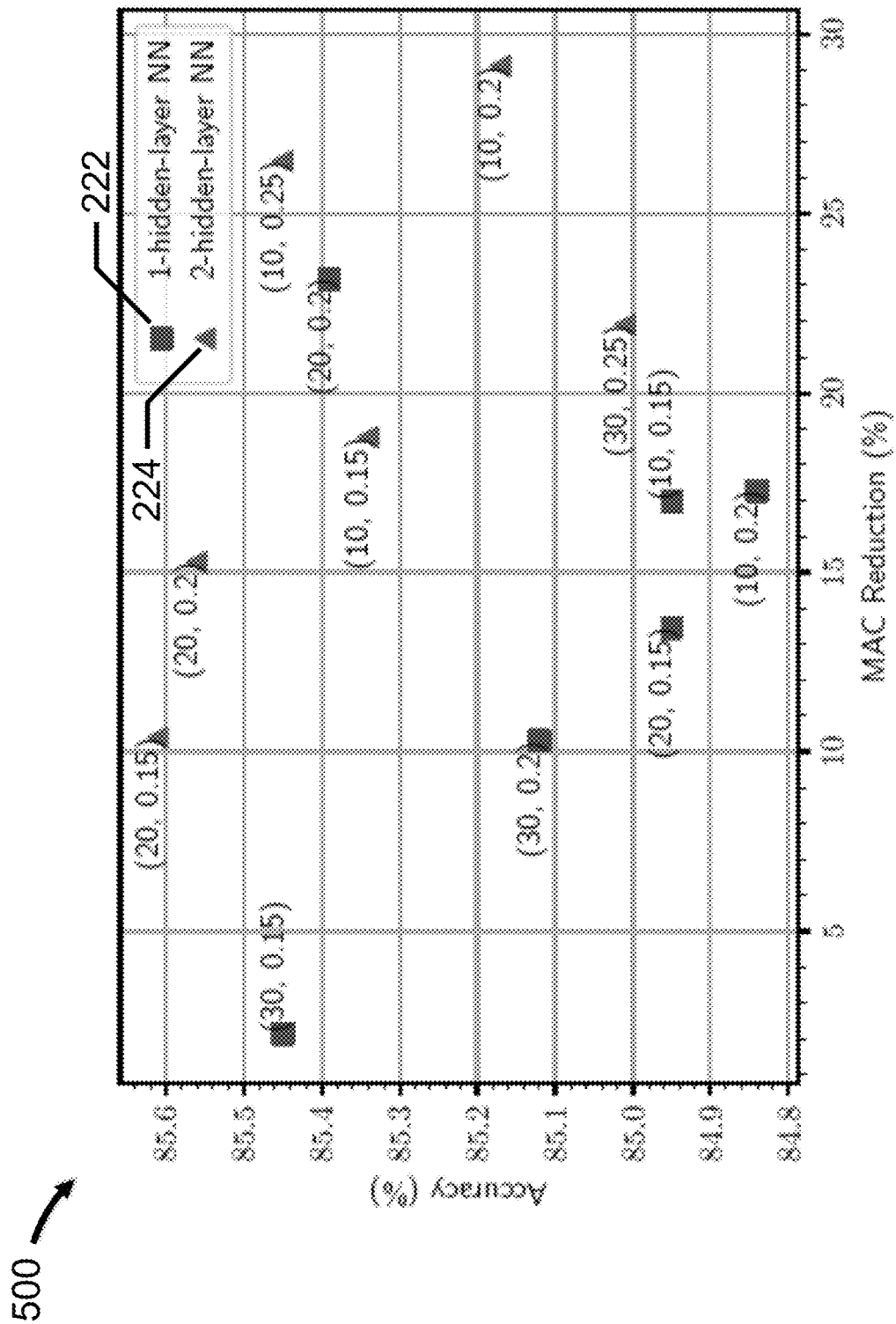
FIG. 8 presents a graph showing the performance of two skip predictors, in accordance with embodiments of the present disclosure.

FIG. 8 presents graph 500 showing the performance of skip predictors 222, 224, in accordance with embodiments of the present disclosure. Each data point is labeled with the number of hidden units per hidden layer, and the cosine distance threshold.

In certain embodiments, skip predictor 220 is a shallow neural network with a small number of hidden layers. Generally, skip predictors 220 based on shallow neural networks and cosine distance thresholds perform well in maintaining accuracy and reducing computations, especially for two hidden-layer configurations. In one embodiment, skip predictor 222 is a shallow neural network with one hidden layer, and skip predictor 224 is a shallow neural network with two hidden layers. Skip predictors 222, 224 are trained using a training dataset that is based on the SST dataset, as discussed above.

The highest accuracy depicted in FIG. 8 is about 86% for skip predictor 224 (20 hidden units per hidden layer, 0.15 cosine distance threshold), and has a MAC reduction of about 10%. The best computation saving depicted in FIG. 8 is about 29% for skip predictor 224 (10 hidden units per hidden layer, 0.2 cosine distance threshold), and has an accuracy of about 85%.

In one embodiment, a balance between accuracy loss and computational saving may be achieved by skip predictor 224 with 10 hidden units per hidden layer and a cosine distance threshold setting of 0.25. The accuracy is about 85% and the computational saving is about 26%, while the average skipping rate for each sentence is about 20% (not depicted in FIG. 8). Compared to RNN model 210 trained on the LST dataset with one hidden layer with 100 hidden units (table 300), this embodiment of skip predictor 224 has a memory footprint that is 40× smaller.

Figure 9:
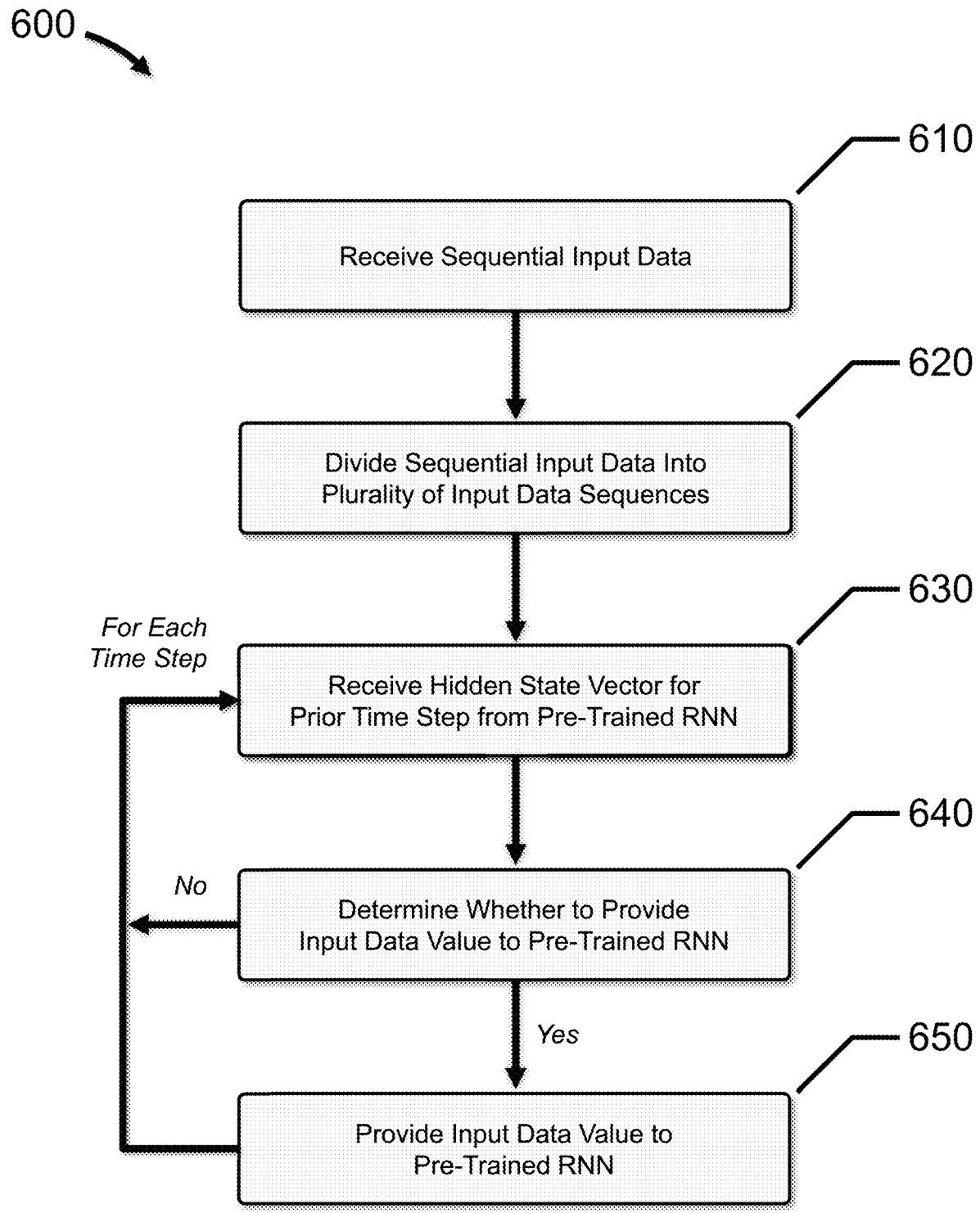
FIG. 9 depicts a flow diagram presenting functionality for skipping recurrent neural network (RNN) state updates using a skip predictor, in accordance with embodiments of the present disclosure.

FIG. 9 depicts a flow diagram 600 presenting functionality for skipping recurrent neural network (RNN) state updates using a skip predictor, in accordance with embodiments of the present disclosure.

At 610, sequential input data are received.

At 620, the sequential input data are divided into a plurality of input data sequences. Each input data sequence includes a sequence of input data values, and each input data value is associated with a different time step for a pre-trained RNN model having a hidden state vector.

The functionality at 630 and 640 are executed for each time step, while execution of the functionality at 650 depends on 640.

At 630, the hidden state vector for a prior time step is received from the pre-trained RNN model.

At 640, whether to provide or not provide the input data value associated with the time step to the pre-trained RNN model for processing is determined based on the input data value and the hidden state vector for at least one prior time step.

In one embodiment, whether to provide or not provide the input data value associated with the time step is determined based on the input data value and the hidden state vector for the immediately preceding time step.

In another embodiment, the determination whether to provide or not provide the input data value associated with the time step is based on a time step stride as well as the input data value and the hidden state vector for the immediately preceding time step. For example, the determination whether to provide or not provide the input data value associated with the time step may be performed every other time step (i.e., a time step stride of 2), every third time step (i.e., a time step stride of 3), every fourth time step (i.e., a time step stride of 4), etc. When the determination whether to provide or not provide the input data value associated with the time step is not performed, the input data value is not provided.

In a further embodiment, the determination whether to provide or not provide the input data value associated with the time step is based on the input data value and the hidden state vector for two or more preceding time steps. In other words, the determination is based on the input data value and the hidden state vector for a combined history of these data. For example, the skip predictor may base the determination on a combined history of the last N input data values (where N is the full history of input data values), as well as a combined history of N hidden state vectors (where N is the full history of hidden state vectors). In another example, less than the full histories of N input data values and N hidden state vectors may be considered, such as 2 input data values and 2 hidden state vectors, 3 input data values and 3 hidden state vectors, . . . , N−1 input data values and N−1 hidden state vectors. These partial histories may include input data values and hidden states vectors for contiguous time steps, e.g., the last 3 immediately preceding time steps (i.e., t−1, t−2, t−3), etc., or discontinuous time steps, e.g., the last 3 preceding time steps skipping every other time step (i.e., t−1, t−3, t−5), etc.

When the input data value associated with the time step is determined to be provided to the pre-trained RNN, flow proceeds to 650. When the input data value associated with the time step is determined to be not provided to the pre-trained RNN, flow returns to 630 for processing the next time step.

At 650, the input data value associated with the time step to the pre-trained RNN model is provided for processing, the processing including updating the hidden state vector for the time step.

The skip predictor is trained without retraining the pre-trained RNN model.

The embodiments described herein are combinable.

In one embodiment, a system includes a processor, coupled to a memory, configured to execute a skip predictor and a pre-trained recurrent neural network (RNN) model having a hidden state vector.

The skip predictor is configured to read the sequential input data from the memory; divide the sequential input data into a plurality of input data sequences, each input data sequence including a sequence of input data values, each input data value being associated with a different time step for the pre-trained RNN model; and, at each time step, receive the hidden state vector for a prior time step from the pre-trained RNN model, determine, based on the input data value and the hidden state vector for at least one prior time step, whether to provide or not provide the input data value associated with the time step to the pre-trained RNN model for processing, when so determined, provide the input data value associated with the time step to the pre-trained RNN model for processing, and when so determined, not provide the input data value associated with the time step to the pre-trained RNN model.

The RNN model is configured to for each input data value received from the skip predictor, process the input data value, and update the hidden state vector, and generate the output data after a last input data value is processed.

The skip predictor is trained without retraining the pre-trained RNN model.

The memory may be configured to store the sequential input data, the output data, the skip predictor, and the pre-trained RNN model.

In another embodiment of the system, determining whether to provide or not provide the input data value associated with the time step to the pre-trained RNN model for processing is based on the input data value and the hidden state vector for an immediately preceding time step.

In another embodiment of the system, the skip predictor is a logistic regression classifier, a random forest classifier, or a shallow neural network.

In another embodiment of the system, the skip predictor is a shallow neural network that has two hidden layers, and each hidden layer has 10 hidden nodes.

In another embodiment of the system, the skip predictor is a baseline skip predictor configured to compute an updated hidden state vector of the pre-trained RNN model based on the input data value at a current time step and the hidden state vector from the prior time step.

In another embodiment of the system, the baseline skip predictor is modified to remove one or more input data values from the sequential input data based on a stop-word list.

In another embodiment of the system, the baseline skip predictor is modified to remove one or more input data values located between a beginning of each input data sequence and an end of each input data sequence.

In one embodiment, a method for skipping recurrent neural network (RNN) state updates using a skip predictor includes receiving sequential input data; dividing the sequential input data into a plurality of input data sequences, each input data sequence including a sequence of input data values, each input data value being associated with a different time step for a pre-trained RNN model having a hidden state vector; and at each time step, receiving the hidden state vector for a prior time step from the pre-trained RNN model, determining, based on the input data value and the hidden state vector for at least one prior time step, whether to provide or not provide the input data value associated with the time step to the pre-trained RNN model for processing, when so determined, providing the input data value associated with the time step to the pre-trained RNN model for processing, the processing including updating the hidden state vector, and when so determined, not providing the input data value associated with the time step to the pre-trained RNN model and not updating the hidden state vector, where the skip predictor is trained without retraining the pre-trained RNN model.

In another embodiment of the method, determining whether to provide or not provide the input data value associated with the time step to the pre-trained RNN model for processing is based on the input data value and the hidden state vector for an immediately preceding time step.

In another embodiment of the method, the skip predictor is a logistic regression classifier, a random forest classifier, or a shallow neural network.

In another embodiment of the method, the skip predictor is a shallow neural network that has two hidden layers, and each hidden layer has 10 hidden nodes.

In another embodiment of the method, the skip predictor is a baseline skip predictor configured to compute an updated hidden state vector of the pre-trained RNN model based on the input data value at a current time step and the hidden state vector from the prior time step.

In another embodiment of the method, the baseline skip predictor is modified to remove one or more input data values from the sequential input data based on a stop-word list.

In another embodiment of the method, the baseline skip predictor is modified to remove one or more input data values located between a beginning of each input data sequence and an end of each input data sequence.

In one embodiment, a method for generating a training dataset for a skip predictor for a recurrent neural network (RNN) includes dividing a training dataset for a pre-trained RNN model into a plurality of training sequences, each training sequence including a sequence of training data values, each training data value ($x^i_t$) being associated with a different time step; providing the training sequences to the pre-trained RNN model for processing, the processing including for each time step of each training sequence, determining a hidden state vector ($h^i_t$) for the time step based on the training data value ($x^i_t$) for the time step and the hidden state vector ($h^i_{t-1}$) for a prior time step, and storing the training data value ($x^i_t$) for the time step, the hidden state vector ($h_t$) for the time step and the hidden state vector ($h^i_{t-1}$) for the prior time step as a time step data set; for each time step data set, quantizing a difference between the hidden state vector ($h^i_t$) for the time step and the hidden state vector ($h^i_{t-1}$) for the prior time step to generate a quantized value, and creating a label associated with the time step based on a comparison of the quantized value to a threshold; creating a set of features and associated labels based on the training data value ($x^i_t$) for each time step, the hidden state vector ($h^i_t$) for each time step, and the label for each time step; and creating a skip predictor training dataset based on the training dataset, the set of features and the associated labels.

In another embodiment of the method, the quantized value is determined by a cosine distance function given by:

$$C_t = 1 - \cos(h_{t-1}, h_t) = 1 - \frac{h_{t-1} \cdot h_t}{\|h_{t-1}\|\|h_t\|}.$$

In another embodiment of the method, the quantized value is determined by an $L_2$ norm distance function given by:

$$N_t = \|h_t - h_{t-1}\|.$$

In another embodiment of the method, the method further includes calculating a hidden state vector transition for each training data value ($x^i_t$) in each sequence; determining a statistical distribution of the hidden state vector transitions based on a cosine distance function or an $L_2$ norm distance function; and determining the threshold based on the statistical distribution of the hidden state vector transitions.

In another embodiment of the method, the method further includes determining the threshold based on at least one of accuracy, performance or skipping percentage.

In another embodiment of the method, the method further includes training the skip predictor based on the skip predictor training dataset.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system, comprising:
a processor, coupled to memory, configured to execute a skip predictor and a pre-trained recurrent neural network (RNN) model having a hidden state vector, the pre-trained RNN model including for each time step of a training sequence:
a training hidden state vector ($h^i_t$) for the time step determined based on the training data value ($x^i_t$) for the time step and a prior training hidden state vector ($h^i_{t-1}$) for a prior time step in which a difference between the training hidden state vector ($h^i_t$) and the prior training hidden state vector ($h^i_{t-1}$) is quantized,
where the skip predictor is configured to:
read sequential input data from the memory;
divide the sequential input data into a plurality of input data sequences, each input data sequence including a sequence of input data values, each input data value being associated with a different time step for the pre-trained RNN model; and
at each time step:
receive the hidden state vector for a prior time step from the pre-trained RNN model,
determine, based on the input data value and the hidden state vector for at least one prior time step, whether to provide or not provide the input data value associated with the time step to the pre-trained RNN model for processing,
when so determined, provide the input data value associated with the time step to the pre-trained RNN model for processing, and
when so determined, not provide the input data value associated with the time step to the pre-trained RNN model,
where, at each time step, the RNN model is configured to:
when an input data value associated with the time step is received from the skip predictor:
process the input data value, and
update the hidden state vector,
when an input data value associated with the time step is not received from the skip predictor:
skip processing data for the time step, and
not update the hidden state vector, and
generate output data after a last input data value is processed,
where the skip predictor is trained without retraining the pre-trained RNN model.

2. The system of claim 1, where said determine whether to provide or not provide the input data value associated with the time step to the pre-trained RNN model for processing is based on the input data value and the hidden state vector for an immediately preceding time step.

3. The system of claim 1, where the skip predictor is one of a logistic regression classifier, a random forest classifier, or a shallow neural network.

4. The system of claim 1, where the skip predictor is a shallow neural network that has two hidden layers, and each hidden layer has 10 hidden nodes.

5. The system of claim 1, where the skip predictor is a baseline skip predictor configured to compute an updated hidden state vector of the pre-trained RNN model based on the input data value at a current time step and the hidden state vector from the prior time step.

6. The system of claim 5, where the baseline skip predictor is modified to remove one or more input data values from the sequential input data based on a stop-word list.

7. The system of claim 5, where the baseline skip predictor is modified to remove one or more input data values located between a beginning of each input data sequence and an end of each input data sequence.

8. A method for skipping recurrent neural network (RNN) state updates using a skip predictor, comprising:
at the skip predictor:
receiving sequential input data;
dividing the sequential input data into a plurality of input data sequences, each input data sequence including a sequence of input data values, each input data value being associated with a different time step for a pre-trained RNN model having a hidden state vector; and
at each time step:
receiving the hidden state vector for a prior time step from the pre-trained RNN model, the pre-trained RNN model including for each time step of a training sequence:
a training hidden state vector ($h^i_t$) for the time step determined based on the training data value ($x^i_t$) for the time step and a prior training hidden state vector ($h^i_{t-1}$) for a prior time step in which a difference between the training hidden state vector ($h^i_t$) and the prior training hidden state vector ($h^i_{t-1}$) is quantized,
determining, based on the input data value and the hidden state vector for at least one prior time step, whether to provide or not provide the input data value associated with the time step to the pre-trained RNN model for processing,
when so determined, providing the input data value associated with the time step to the pre-trained RNN model for processing, and
when so determined, not providing the input data value associated with the time step to the pre-trained RNN model,
at the RNN model:
at each time step:
when an input data value associated with the time step is received from the skip predictor:
processing the input data value, and
updating the hidden state vector, when an input data value associated with the time step is not received from the skip predictor:
skipping processing data for the time step, and not updating the hidden state vector, and
generating output data after a last input data value is processed,
where the skip predictor is trained without retraining the pre-trained RNN model.

9. The method of claim 8, where said determining whether to provide or not provide the input data value associated with the time step to the pre-trained RNN model for processing is based on the input data value and the hidden state vector for an immediately preceding time step.

10. The method of claim 8, where the skip predictor is one of a logistic regression classifier, a random forest classifier, or a shallow neural network.

11. The method of claim 8, where the skip predictor is a shallow neural network that has two hidden layers, and each hidden layer has 10 hidden nodes.

12. The method of claim 8, where the skip predictor is a baseline skip predictor configured to compute an updated hidden state vector of the pre-trained RNN model based on the input data value at a current time step and the hidden state vector from the prior time step.

13. The method of claim 12, where the baseline skip predictor is modified to remove one or more input data values from the sequential input data based on a stop-word list.

14. The method of claim 12, where the baseline skip predictor is modified to remove one or more input data values located between a beginning of each input data sequence and an end of each input data sequence.

15. A method for generating a training dataset for a skip predictor for a recurrent neural network (RNN), comprising:
dividing a training dataset for a pre-trained RNN model into a plurality of training sequences, each training sequence including a sequence of training data values, each training data value ($x^i_t$) being associated with a different time step;
providing the training sequences to the pre-trained RNN model for processing, the processing including:
for each time step of each training sequence:
determining a hidden state vector ($h^i_t$) for a time step based on the training data value WO for the time step and the hidden state vector ($h^i_{t-1}$) for a prior time step, and
storing the training data value ($x^i_t$) for the time step, the hidden state vector ($h^i_t$) for the time step and the hidden state vector ($h^i_{t-1}$) for the prior time step as a time step data set;
for each time step data set:
quantizing a difference between the hidden state vector ($h^i_t$) for the time step and the hidden state vector ($h^i_{t-1}$) for the prior time step to generate a quantized value, and
creating a label associated with the time step based on a comparison of the quantized value to a threshold;
creating a set of features and associated labels based on the training data value ($x^i_t$) for each time step, the hidden state vector ($h^i_t$) for each time step, and the label for each time step; and
creating a skip predictor training dataset based on the training dataset, the set of features and the associated labels.

16. The method of claim 15, where the quantized value is determined by a cosine distance function given by:

$$C_t = 1 - \cos(h_{t-1}, h_t) = 1 - \frac{h_{t-1} \cdot h_t}{\|h_{t-1}\|\|h_t\|}.$$

17. The method of claim 15, where the quantized value is determined by an $L_2$ norm distance function given by:

$$N_t = \|h_t - h_{t-1}\|.$$

18. The method of claim 15, further comprising:
calculating a hidden state vector transition for each training data value ($x^i_t$) in each sequence;
determining a statistical distribution of the hidden state vector transitions based on a cosine distance function or an $L_2$ norm distance function; and
determining the threshold based on the statistical distribution of the hidden state vector transitions.

19. The method of claim 15, further comprising determining the threshold based on accuracy, performance, or skipping percentage.

20. The method of claim 15, further comprising training the skip predictor based on the skip predictor training dataset.

* * * * *